(12) United States Patent
Yeates et al.

(10) Patent No.: US 11,280,569 B2
(45) Date of Patent: Mar. 22, 2022

(54) OVERMOLDED / THROUGH-MOLDED FIREARM MAGAZINE

(71) Applicant: Sentry Solutions Products Group LLC, Virginia Beach, VA (US)

(72) Inventors: Eric M. Yeates, Virginia Beach, VA (US); Thomas M. Gregory, Belgrade, MT (US); James D. Smith, Bozeman, MT (US); Graham J. Francis, Bozeman, MT (US)

(73) Assignee: Sentry Solutions Products Group LLC, Virginia Beach, VA (US)

( * ) Notice: Subject to any disclaimer, the term of this patent is extended or adjusted under 35 U.S.C. 154(b) by 0 days.

(21) Appl. No.: 16/961,980

(22) PCT Filed: Jan. 22, 2019

(86) PCT No.: PCT/US2019/014638
§ 371 (c)(1),
(2) Date: Jul. 14, 2020

(87) PCT Pub. No.: WO2019/144160
PCT Pub. Date: Jul. 25, 2019

(65) Prior Publication Data
US 2021/0080204 A1 Mar. 18, 2021

Related U.S. Application Data

(60) Provisional application No. 62/620,412, filed on Jan. 22, 2018.

(51) Int. Cl.
*F41A 9/65* (2006.01)
*B29C 45/14* (2006.01)
(Continued)

(52) U.S. Cl.
CPC .......... *F41A 9/65* (2013.01); *B29C 45/14336* (2013.01); *B29K 2705/00* (2013.01); *B29L 2031/7772* (2013.01)

(58) Field of Classification Search
CPC ................. F41A 9/65; B29C 45/14336; B29C 45/14631; B29K 2705/00; B29L 2031/7772
See application file for complete search history.

(56) References Cited

U.S. PATENT DOCUMENTS 5,149,897 A * 9/1992 Howard ................... F41A 9/65
42/50
8,127,483 B2 * 3/2012 Kincel .................... F41C 23/14
42/73
(Continued)

OTHER PUBLICATIONS

RTP Company, "Shut-Offs: Thermoplastic Elastomer Molding Guidelines: Overmolding Design Considerations", https://www.rtpcompany.com/technical-info/molding-guidelines/tpe-molding-guidelines/shut-offs/ (Year: 2017).*

*Primary Examiner* — Joshua T Semick
(74) *Attorney, Agent, or Firm* — Shaddock Law Group, PC

(57) ABSTRACT

An overmolded/through-molded firearm magazine including at least some of one or more wall portions defining a magazine core, wherein the magazine core extends from a substantially open top portion to a substantially open bottom portion and at least partially defines a core cavity; at least one core aperture/recess formed through a portion of one or more of the one or more wall portions; and an overmolded body formed atop at least a portion of an exterior surface of the magazine core, wherein at least a portion of the overmolded body extends at least partially through the at least one core aperture/recess, forming a through-core protrusion.

20 Claims, 26 Drawing Sheets

(51) Int. Cl.
  *B29K 705/00* (2006.01)
  *B29L 31/00* (2006.01)

(56) References Cited

U.S. PATENT DOCUMENTS

| | | | |
|---|---|---|---|
| 10,066,886 B2* | 9/2018 | Vilardi | F41A 9/69 |
| 10,161,697 B1* | 12/2018 | Underwood | F41A 3/72 |
| 10,690,441 B2* | 6/2020 | Washburn, III | F41A 11/02 |
| 2004/0020092 A1* | 2/2004 | Christensen | F41A 9/61 |
| | | | 42/49.01 |
| 2010/0281737 A1* | 11/2010 | Cahill | F41A 9/71 |
| | | | 42/50 |

* cited by examiner

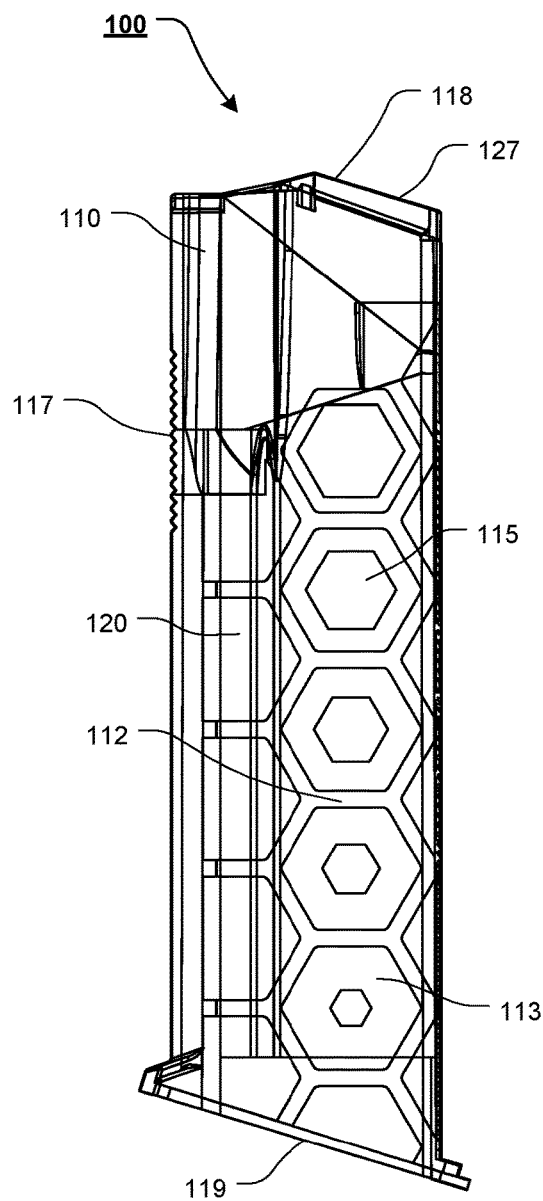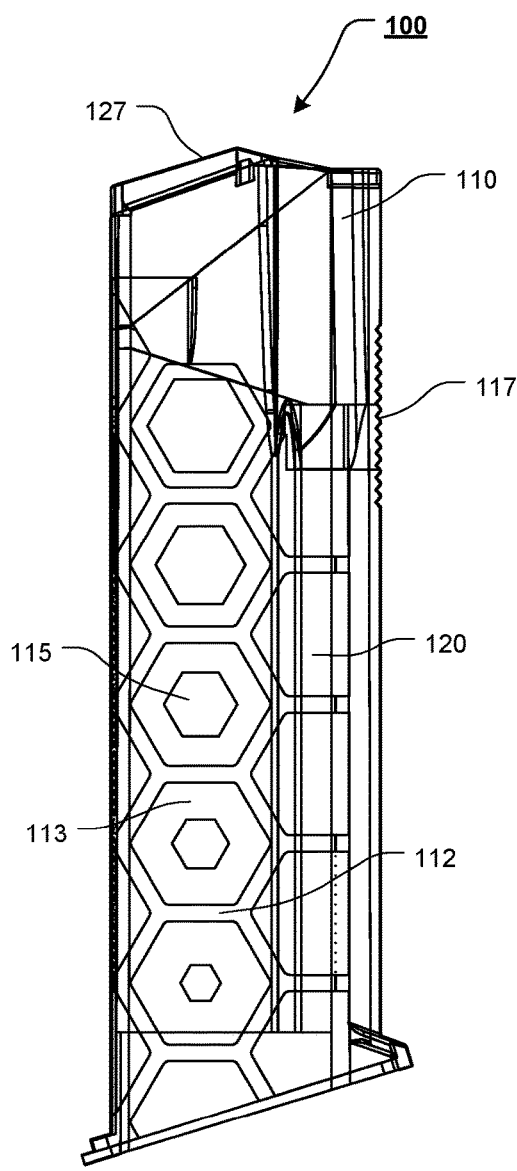
FIG. 15                    FIG. 16

OVERMOLDED / THROUGH-MOLDED FIREARM MAGAZINE

CROSS-REFERENCE TO RELATED APPLICATIONS

This patent application claims the benefit of U.S. Patent Application Ser. No. 62/620,412, filed Jan. 22, 2018, the entire disclosure of which is incorporated herein by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE PRESENT DISCLOSURE

1. Field of the Present Disclosure

The present disclosure relates generally to the field of firearm magazines. More specifically, the presently disclosed systems, methods, and/or apparatuses relate to an overmolded/through-molded firearm magazine, adaptable to be used with a handgun, a rifle, or other firearm or weapon.

2. Description of Related Art

It is generally known to form ammunition magazines for firearms of metal, plastic, or a combination of metal and plastic. The geometry and rigidity of the area surrounding the feed lips of the magazine are of particular importance. If the feed lips do not maintain a desired orientation, rounds can be misfed from the magazine or can slip past the feed lips and be ejected from the magazine.

Metal magazines provide a desired level of strength and rigidity that is difficult to replicate in plastic magazines.

Magazines formed of metal and plastic are formed either by an exterior metal feed lip portion attached or coupled through a plastic body portion to an interior metal wall portion or by having an interior metal portion with a surrounding plastic portion.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE PRESENT DISCLOSURE

However, typical magazine designs have various shortcomings. For example, in order for plastic magazines to provide a desired level of strength and rigidity, the material used to form the plastic magazines renders the magazines brittle. For magazines having an exterior metal feed lip portion attached or coupled through a plastic body portion to an interior metal wall portion, the overmolded body includes a partial metal exterior, a partial metal interior, and a plastic portion "sandwiched" between the exterior metal portion and the interior metal portion. This requires a joining of the exterior and interior metal portions through the plastic portion.

In the case of an interior metal portion with a surrounding plastic portion, the plastic portion is merely positioned atop the metal portion and can be easily removed or peeled away from the metal portion.

In various exemplary, non-limiting embodiments, the overmolded/through-molded magazine of the present disclosure comprises an overmolded/through-molded magazine having a magazine cavity, comprising one or more wall portions defining a magazine core, wherein the magazine core extends from a substantially open top portion to a substantially open bottom portion and defines a core cavity; at least one core aperture/recess formed through a portion of one or more of the one or more wall portions; and an overmolded body formed atop at least a portion of an exterior surface of the magazine core, wherein at least a portion of the overmolded body extends at least partially through the at least one core aperture/recess, forming a through-core protrusion.

In various exemplary, nonlimiting embodiments, at least a portion of the through-core protrusion of the overmolded body extends through at least a portion of the at least one core aperture/recess and into at least a portion of the magazine cavity.

In various exemplary, nonlimiting embodiments, the magazine cavity is defined by at least a portion of the one or more wall portions and the overmolded body.

In various exemplary, nonlimiting embodiments, the magazine cavity is defined by one or more portions of the overmolded body and wherein a portion of the overmolded body within the core cavity is integrally joined to an extension of a portion of the overmolded body, via the at least one through-core protrusion.

In various exemplary, nonlimiting embodiments, the magazine core is substantially rigid.

In various exemplary, nonlimiting embodiments, the overmolded body is substantially resilient.

In various exemplary, nonlimiting embodiments, the magazine core is formed of a material that is different from a material used to form the overmolded body.

In various exemplary, nonlimiting embodiments, a material used to form the overmolded body is substantially transparent or translucent.

In various exemplary, nonlimiting embodiments, a material used to form the overmolded body is substantially opaque.

In various exemplary, nonlimiting embodiments, a single outer mold may be used to form the overmolded body to the magazine core, while a variety of different mold inserts can be utilized to create the magazine cavity. As material from outside the magazine core flows through the core aperture/recesses and into the core cavity, the selected mold insert can dictate the size, shape, and/or internal dimensions of the magazine cavity. Thus, magazines having a substantially similar exterior can be created for various capacities or calibers.

In this manner, the amount of tooling required to produce a variety of overmolded/through-molded magazines is greatly reduced, when compared to the amount of tooling required to produce known magazines.

Accordingly, the overmolded/through-molded magazine of the present disclosure separately and optionally provides a magazine having an at least partially overmolded magazine core.

The overmolded/through-molded magazine of the present disclosure separately and optionally provides an overmolded body having one or more through-core protrusions, which extend into at least one recess formed in or aperture formed through the magazine core.

The overmolded/through-molded magazine of the present disclosure separately and optionally provides a magazine, which provides an internal, skeletonized reinforcement core and an at least partially overmolded body.

The overmolded/through-molded magazine of the present disclosure separately and optionally provides a magazine, having an at least partially transparent or translucent overmolded body.

The overmolded/through-molded magazine of the present disclosure separately and optionally provides a magazine, having an at least partially transparent or translucent overmolded body that allows at least a portion of the magazine core to be viewable through at least a portion of the overmolded body.

The presently disclosed systems, methods, and/or apparatuses separately and optionally provide an overmolded/through-molded magazine that can be manufactured to accommodate a variety of firearms.

These and other aspects, features, and advantages of the presently disclosed systems, methods, and/or apparatuses are described in or are apparent from the following detailed description of the exemplary, non-limiting embodiments of the presently disclosed systems, methods, and/or apparatuses and the accompanying figures. Other aspects and features of embodiments of the presently disclosed systems, methods, and/or apparatuses will become apparent to those of ordinary skill in the art upon reviewing the following description of specific, exemplary embodiments of the presently disclosed systems, methods, and/or apparatuses in concert with the figures. While features of the presently disclosed systems, methods, and/or apparatuses may be discussed relative to certain embodiments and figures, all embodiments of the presently disclosed systems, methods, and/or apparatuses can include one or more of the features discussed herein. Further, while one or more embodiments may be discussed as having certain advantageous features, one or more of such features may also be used with the various embodiments of the systems, methods, and/or apparatuses discussed herein. In similar fashion, while exemplary embodiments may be discussed below as device, system, or method embodiments, it is to be understood that such exemplary embodiments can be implemented in various devices, systems, and methods of the presently disclosed systems, methods, and/or apparatuses.

Any benefits, advantages, or solutions to problems that are described herein with regard to specific embodiments are not intended to be construed as a critical, required, or essential feature(s) or element(s) of the presently disclosed systems, methods, and/or apparatuses or the claims.

BRIEF DESCRIPTION OF THE SEVERAL VIEWS OF THE DRAWINGS

As required, detailed exemplary embodiments of the presently disclosed systems, methods, and/or apparatuses are disclosed herein; however, it is to be understood that the disclosed embodiments are merely exemplary of the presently disclosed systems, methods, and/or apparatuses that may be embodied in various and alternative forms, within the scope of the presently disclosed systems, methods, and/or apparatuses. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the presently disclosed systems, methods, and/or apparatuses.

The exemplary embodiments of the presently disclosed systems, methods, and/or apparatuses will be described in detail, with reference to the following figures, wherein like reference numerals refer to like parts throughout the several views, and wherein:

FIG. 15 illustrates a right side view of an exemplary embodiment of a magazine core, according to the presently disclosed systems, methods, and/or apparatuses;

FIG. 16 illustrates a left side view of an exemplary embodiment of a magazine core, according to the presently disclosed systems, methods, and/or apparatuses;

DETAILED DESCRIPTION OF EXEMPLARY EMBODIMENTS OF THE PRESENT DISCLOSURE

Figure 1:
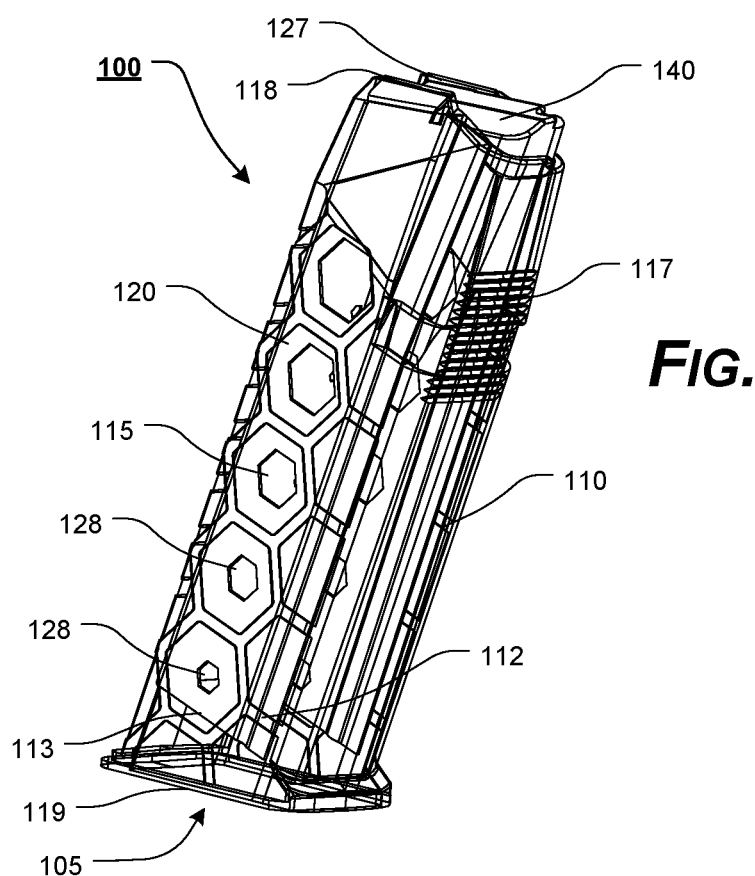
FIG. 1 illustrates a front, left perspective view of an exemplary embodiment of an overmolded firearm magazine, according to the presently disclosed systems, methods, and/or apparatuses.
Figure 2:
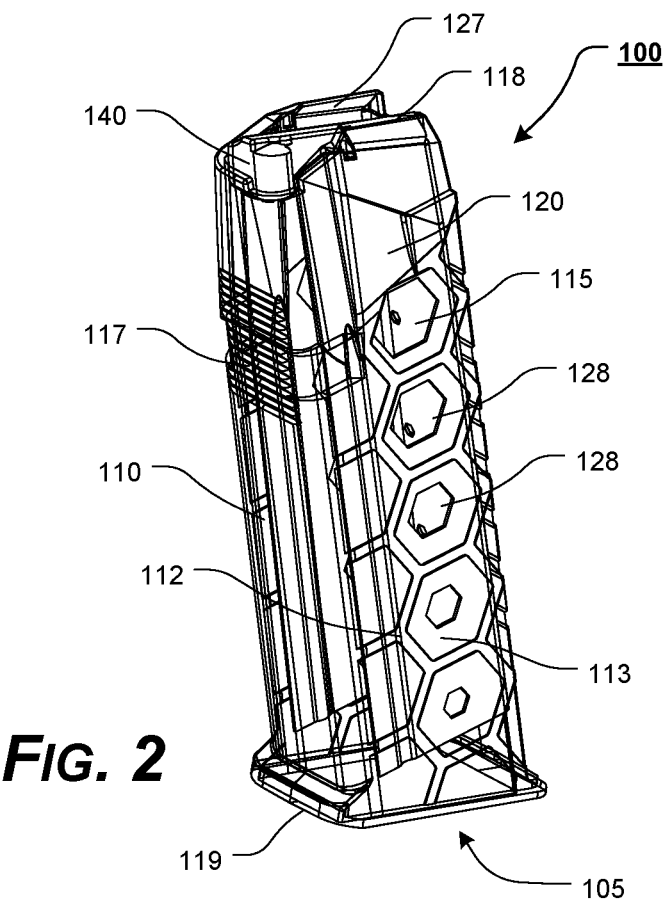
FIG. 2 illustrates a front, right perspective view of an exemplary embodiment of an overmolded firearm magazine, according to the presently disclosed systems, methods, and/or apparatuses.
Figure 3:
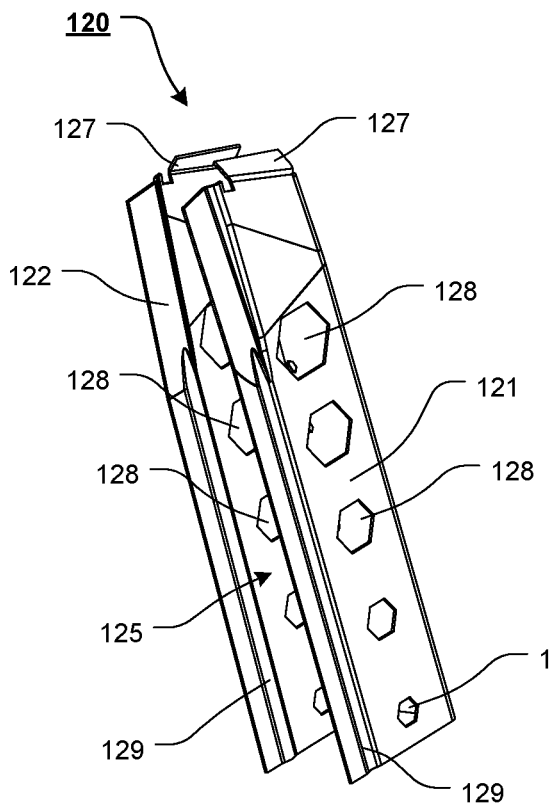
FIG. 3 illustrates a front, right perspective view of an exemplary embodiment of a magazine core, according to the presently disclosed systems, methods, and/or apparatuses.
Figure 4:
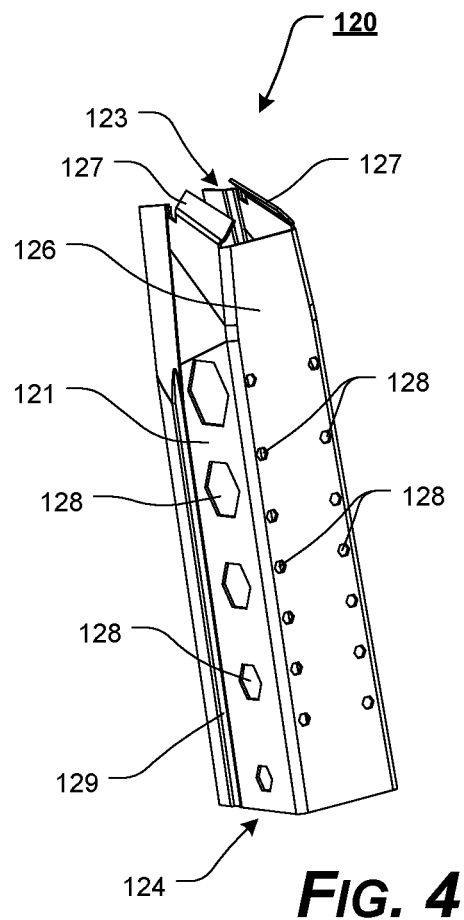
FIG. 4 illustrates a rear, right perspective view of an exemplary embodiment of a magazine core, according to the presently disclosed systems, methods, and/or apparatuses.
Figure 5:
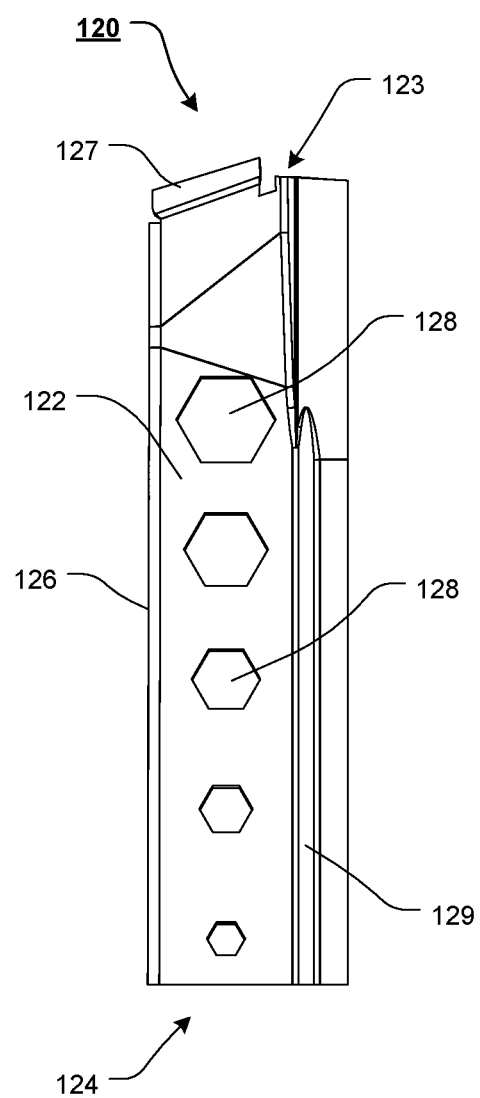
FIG. 5 illustrates a left side view of an exemplary embodiment of a magazine core, according to the presently disclosed systems, methods, and/or apparatuses.
Figure 6:
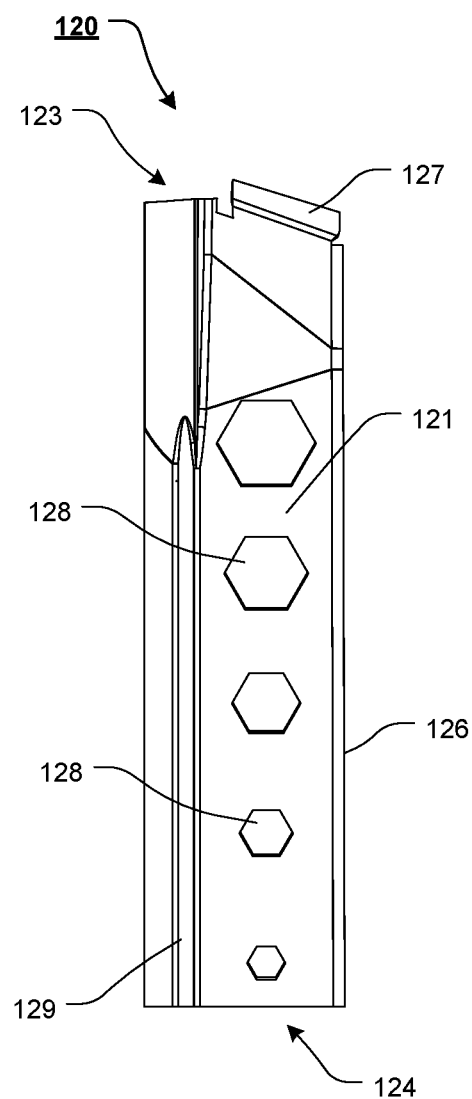
FIG. 6 illustrates a right side view of an exemplary embodiment of a magazine core, according to the presently disclosed systems, methods, and/or apparatuses.
Figure 7:
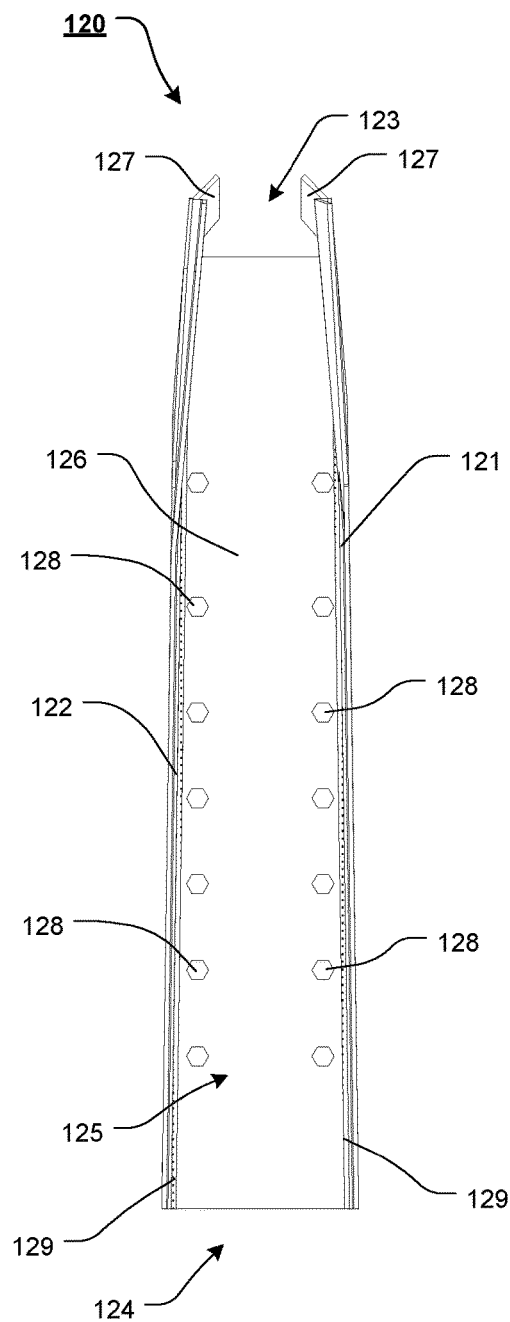
FIG. 7 illustrates a front view of an exemplary embodiment of a magazine core, according to the presently disclosed systems, methods, and/or apparatuses.
Figure 8:
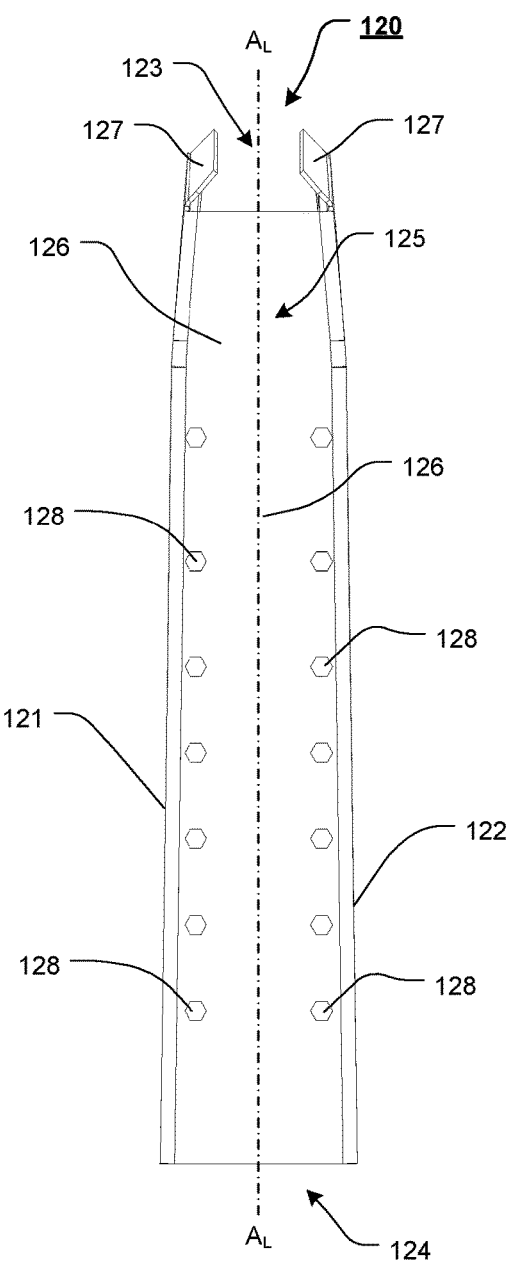
FIG. 8 illustrates a rear view of an exemplary embodiment of a magazine core, according to the presently disclosed systems, methods, and/or apparatuses.
Figure 9:
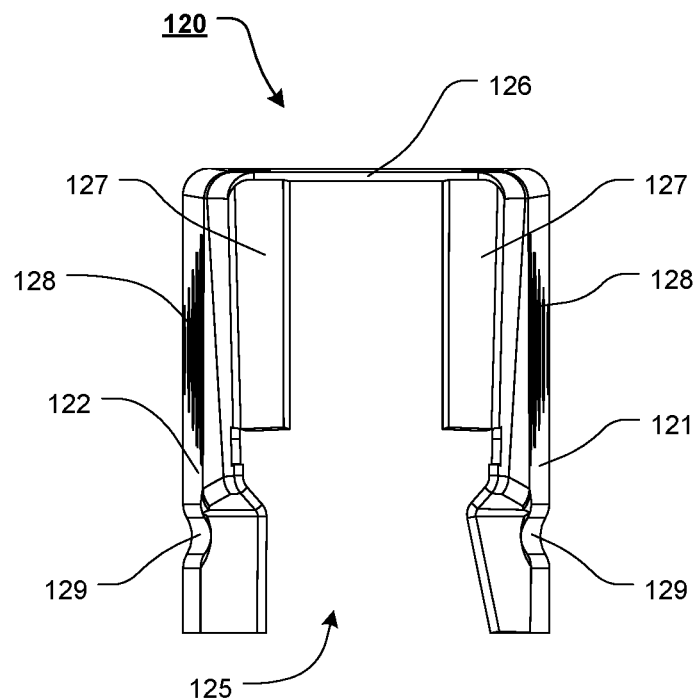
FIG. 9 illustrates a top view of an exemplary embodiment of a magazine core, according to the presently disclosed systems, methods, and/or apparatuses.
Figure 10:
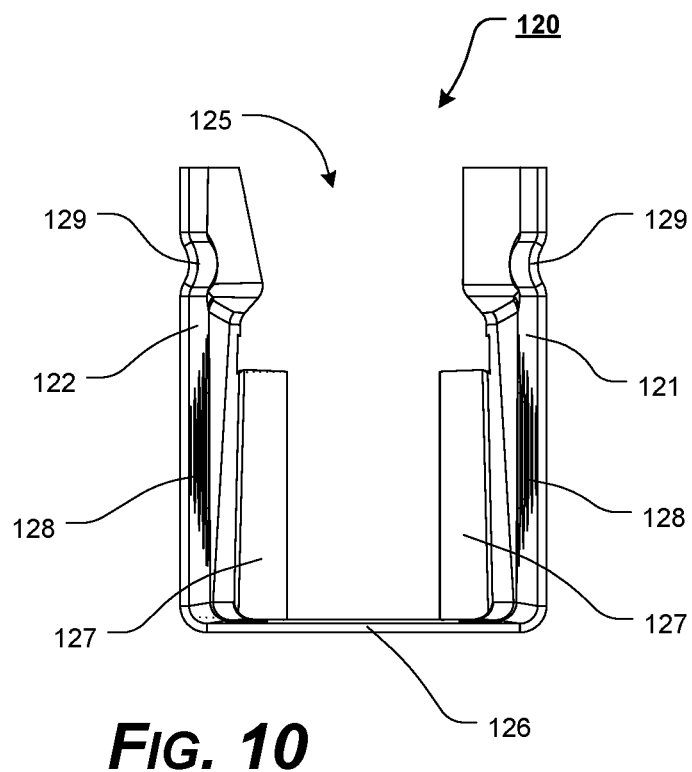
FIG. 10 illustrates a bottom view of an exemplary embodiment of a magazine core, according to the presently disclosed systems, methods, and/or apparatuses.
Figure 11:
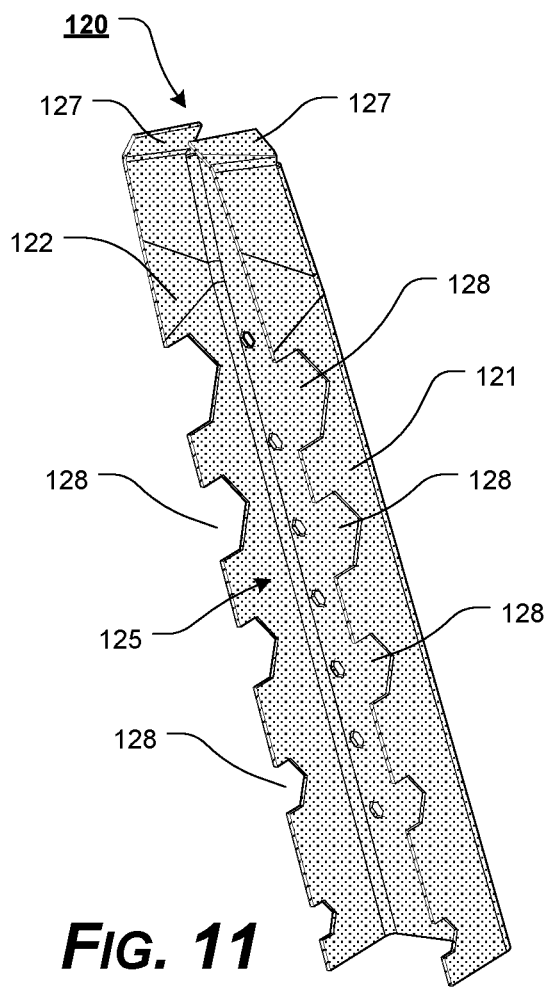
FIG. 11 illustrates a front, right perspective cutaway view of an exemplary embodiment of a magazine core, according to the presently disclosed systems, methods, and/or apparatuses.
Figure 12:
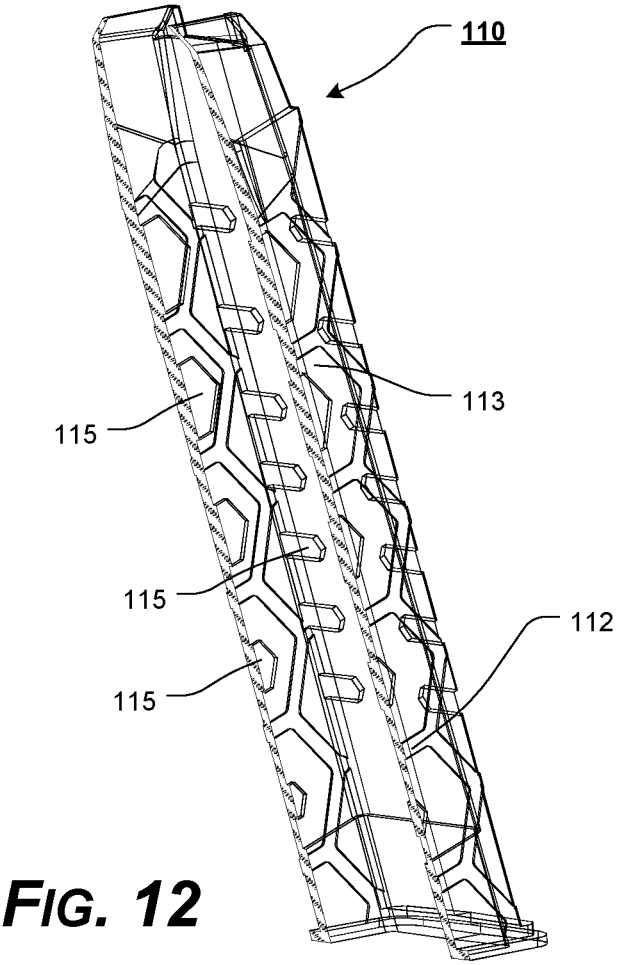
FIG. 12 illustrates a front, right perspective cutaway view of an exemplary embodiment of an overmolded body, according to the presently disclosed systems, methods, and/or apparatuses.
Figure 13:
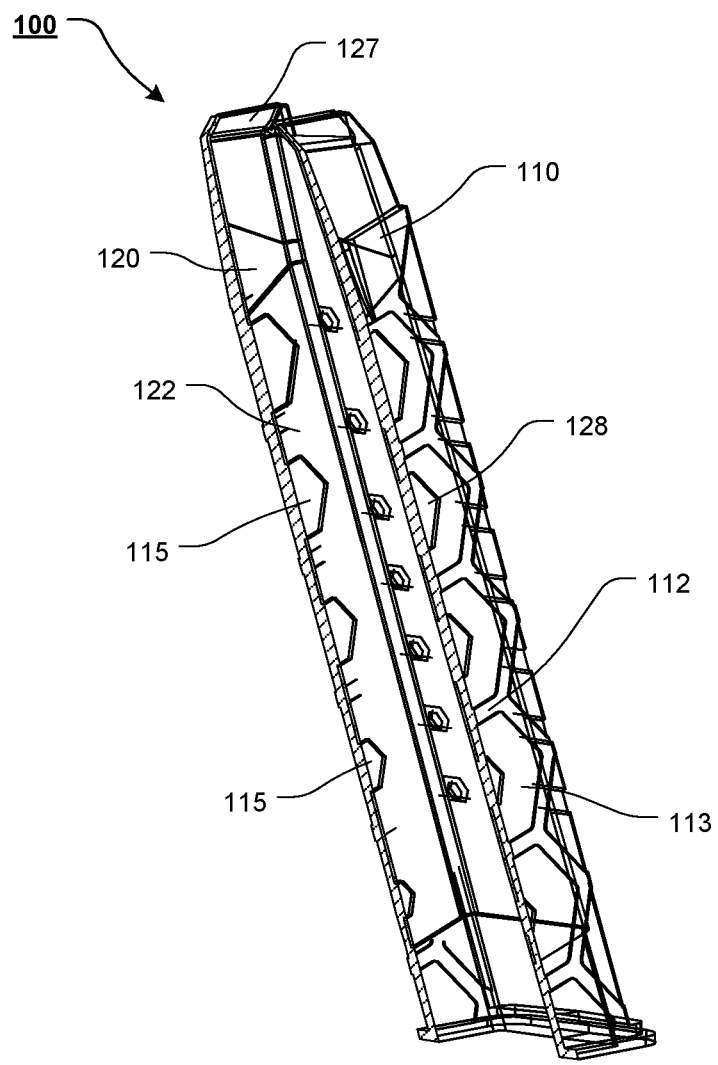
FIG. 13 illustrates a front, right perspective cutaway view of an exemplary embodiment of an overmolded/through-molded magazine, according to the presently disclosed systems, methods, and/or apparatuses.

For simplicity and clarification, the design factors and operating principles of the overmolded/through-molded magazine according to the presently disclosed systems, methods, and/or apparatuses are explained with reference to various exemplary embodiments of an overmolded/through-molded magazine according to the presently disclosed systems, methods, and/or apparatuses. The basic explanation of the design factors and operating principles of the overmolded/through-molded magazine is applicable for the understanding, design, and operation of the overmolded/through-molded magazine of the presently disclosed systems, methods, and/or apparatuses. It should be appreciated that the overmolded/through-molded magazine can be adapted to many applications where a magazine can be used.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the exemplary embodiments and/or elements such terms describe. Thus, these terms are not necessarily intended to indicate temporal or other prioritization of such exemplary embodiments and/or elements.

The term "coupled", as used herein, is defined as connected, although not necessarily directly, and not necessarily mechanically. The terms "a" and "an" are defined as one or more unless stated otherwise.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

It should also be appreciated that the terms "overmolded", "through-molded", "core", "body", and "magazine" are used for a basic explanation and understanding of the operation of the systems, methods, and apparatuses of the present disclosure. Therefore, the terms "overmolded", "through-molded", "core", "body", and "magazine" are not to be construed as limiting the systems, methods, and apparatuses of the present disclosure.

Furthermore, it should be appreciated that, for simplicity and clarification, the embodiments of the present disclosure will be described with reference to an overmolded/through-molded pistol-type magazine. However, it should be appreciated that the operating principles of the disclosed overmolded/through-molded magazine may also be employed to construct overmolded/through-molded rifle magazines, shotgun magazines, or other magazines for any real, replica, training, or toy semiautomatic-type handgun, rifle, shotgun, and/or less than lethal product.

Turning now to the appended drawing figures, FIGS. 1-35 illustrate certain elements, components, and/or aspects of an overmolded/through-molded magazine 100, FIGS. 36-51 illustrate Certain Elements, Components, and/or aspects of an overmolded/through-molded magazine 200, while FIGS. 52-55 illustrate certain elements, components, and/or aspects of an overmolded/through-molded magazine 300, according to the present disclosure. It should be appreciated that, by way of illustration and not limitation, the overmolded/through-molded magazine 100 and the overmolded/through-molded magazine 200 are illustrated as being adapted to be utilized in conjunction with a semiautomatic-type handgun, while the overmolded/through-molded magazine 300 is illustrated as being adapted to be utilized in conjunction with a rifle. However, the overmolded/through-molded magazine 100, the overmolded/through-molded magazine 200, and the overmolded/through-molded magazine 300 of the present disclosure are not so limited.

In illustrative, non-limiting embodiment(s) of the presently disclosed systems, methods, and/or apparatuses, as illustrated in FIGS. 1-35, the illustrated, exemplary overmolded/through-molded magazine 100 includes a magazine core 120 (extending from a top end 123 to a bottom end 124) and an overmolded body 110 (extending from a top end 118 to a bottom end 119) defining a magazine cavity 105 for receiving a magazine follower 140 and magazine spring, while the bottom end 124 of the overmolded body 110 is adapted so as to accept a magazine base plate 130.

In various exemplary embodiments, one or more wall portion (i.e., the rear wall portion 126, the first side wall portion 121, and/or the second side wall portion 122) define the magazine core 120, which extends from a substantially open top end 118 to a bottom end 119 to define a core cavity 125. In these exemplary embodiments, the one or more wall portions define the at least partial core cavity 125 of the magazine core 120.

In certain exemplary embodiments, the magazine core 120 is formed of a first side wall portion 121 and a second side wall portion 122 extending from the rear wall portion 126. The rear wall portion 126, the first side wall portion 121, and the second side wall portion 122 may each comprise a full or complete wall or a partial or combined wall.

The wall portions are formed or joined such that one or more wall portions are sufficient to define the core cavity 125.

Thus, it should be appreciated that the at least partial core cavity 125 may be formed from any number or combination of sidewalls or wall portions, including, for example, a single, continuous wall portion or multiple coupled or joined wall portions. Thus, the at least partial core cavity 125 may be formed by any core cavity 125, partial core cavity 125, or space.

As illustrated, a front portion of the magazine core 120 is open. In various exemplary embodiments, portions of the first side wall portion 121 and the second side wall portion 122 extend from the rear wall portion 126 to an open front end portion.

In certain exemplary, nonlimiting embodiments, the magazine core 120 merely comprises a single wall portion, such as, for example, the rear wall portion 126. Any remaining portions of the magazine core 120 may be attached, coupled, or formed as a portion or extension of the rear wall portion 126.

In certain exemplary, nonlimiting embodiments, the rear wall portion 126 and either of the first side wall portion 121 or the second side wall portion 122 may be incomplete wall portions.

The magazine core 120 provides an internal skeleton or reinforcement structure for the overmolded body 110. The magazine core 120 is typically formed of a different, more rigid material than the overmolded body 110. The magazine core 120 extends from a bottom end 124 to a top end 123 and includes feed lips 127 extending from the top end 123 of the magazine core 120. It should be understood that the feed lips 127 are formed so as to secure a round for feeding into a firearm, as is known in the art.

In various exemplary embodiments, the magazine core 120 is formed of a substantially rigid material, such as, for example, metal, steel, stainless steel, aluminum, titanium, and/or other metals, as well as various alloys and composites thereof, glass-hardened polymers, a polymeric composite, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset sheet materials, or the like, and/or various combinations of the foregoing.

Thus, it should be understood that the material or materials used to form the magazine core 120 is/are substantially rigid, but are a design choice based on the desired appearance and functionality of the magazine core 120.

In various exemplary, nonlimiting embodiments, a longitudinal axis, $A_L$, of the magazine core 120 extends generally from the top end 123 to the bottom end 124.

In various exemplary embodiments, one or more side wall ribs 129 are formed so as to extend into at least a portion of the magazine core 120 to help guide a follower 140 within the magazine cavity 105 of the overmolded/through-molded magazine 100 and/or to add rigidity to the magazine core 120. In various exemplary embodiments, each of the side wall ribs 129 extends substantially along the longitudinal axis, $A_L$, of the magazine core 120 from the bottom end 124 of the magazine core 120, toward the top end 123.

In certain exemplary embodiments, each of the side wall ribs 129 may be formed so as to extend a determined distance from each of the side walls into at least a portion of the core cavity 125 to provide stabilizing interaction to the magazine follower 140 or to limit the degree of travel of the follower 140 within the magazine cavity 105. For example, as illustrated, in FIG. 21, each of the side wall ribs 129 may be formed so as to extend a further determined distance from each of the side walls into at least a portion of the core cavity 125.

In this manner, the number of rounds that can be carried within the magazine cavity 105 can be controlled. This allows the capacity of the magazine to optionally be controlled if, for example, a restricted capacity magazine is desired or if the overmolded/through-molded magazine 100 is to be utilized as a double-stack or single-stack magazine.

Furthermore, a single overmolded/through-molded magazine 100 may optionally include side wall ribs 129 that extend into the core cavity 125 or the magazine cavity 105 so as to fill at least a portion of the core cavity 125 or the magazine cavity 105 and allow a variety of possible magazine followers 140 to be utilized within the magazine cavity 105 or easily retool the machinery used to form the magazine core 120 to vary the interior dimensions of the core cavity 125. In this manner, magazine capacity can be controlled or the interior dimensions of the core cavity 125 or the magazine cavity 105 can be controlled to allow a desired magazine follower 140 to be utilized, rendering the overmolded/through-molded magazine 100 easily capable of caliber conversion during the manufacturing process.

Figure 22:
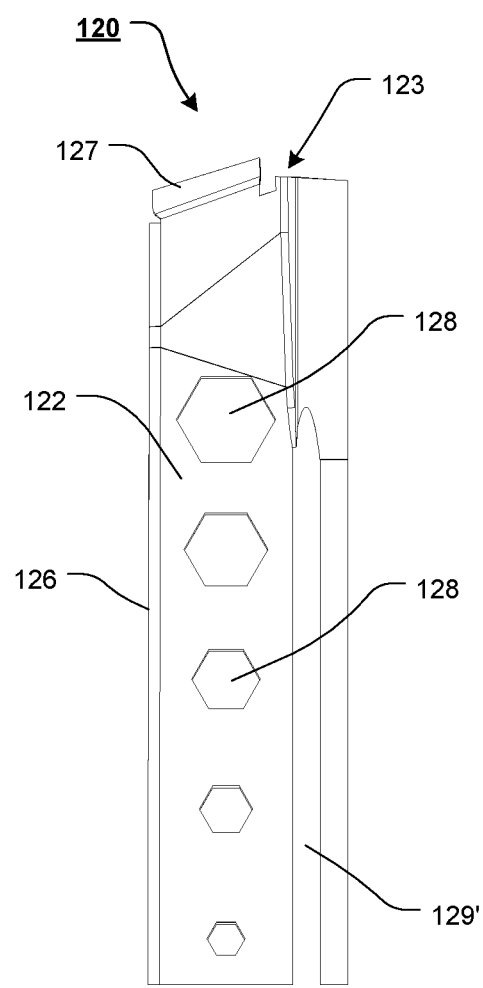
FIG. 22 illustrates a left side view of an exemplary embodiment of a magazine core, according to the presently disclosed systems, methods, and/or apparatuses.
Figure 23:
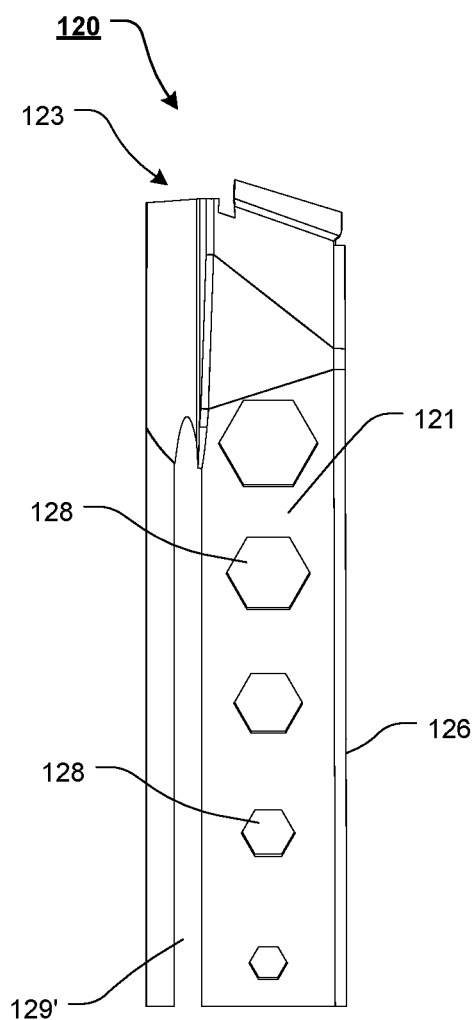
FIG. 23 illustrates a right side view of an exemplary embodiment of a magazine core, according to the presently disclosed systems, methods, and/or apparatuses.
Figure 24:
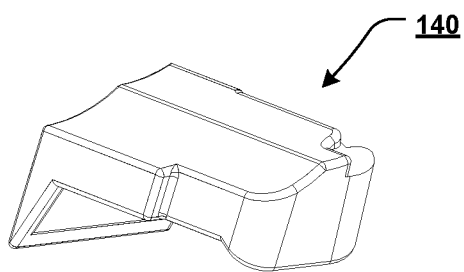
FIG. 24 illustrates a perspective view of an exemplary embodiment of a magazine follower, according to the presently disclosed systems, methods, and/or apparatuses.
Figure 25:
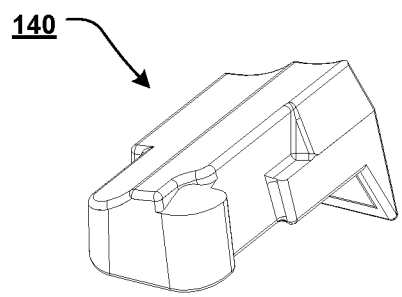
FIG. 25 illustrates a perspective view of an exemplary embodiment of a magazine follower, according to the presently disclosed systems, methods, and/or apparatuses.
Figure 26:
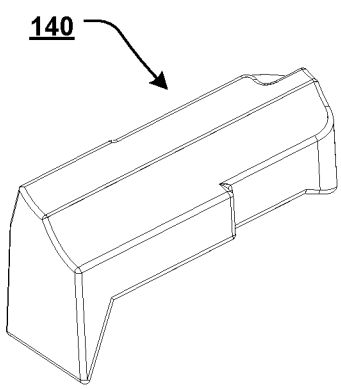
FIG. 26 illustrates a perspective view of an exemplary embodiment of a magazine follower, according to the presently disclosed systems, methods, and/or apparatuses.
Figure 27:
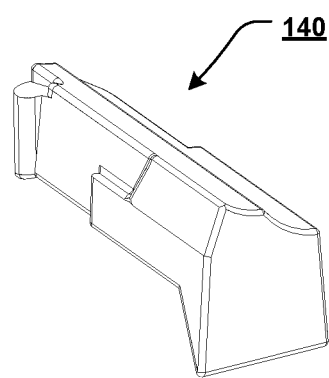
FIG. 27 illustrates a perspective view of an exemplary embodiment of a magazine follower, according to the presently disclosed systems, methods, and/or apparatuses.
Figure 28:
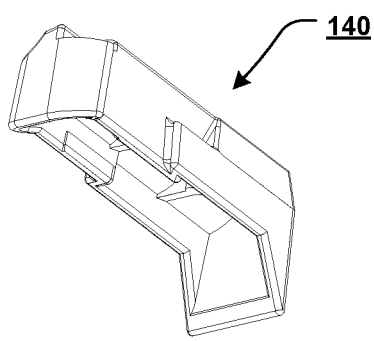
FIG. 28 illustrates a perspective view of an exemplary embodiment of a magazine follower, according to the presently disclosed systems, methods, and/or apparatuses.
Figure 29:
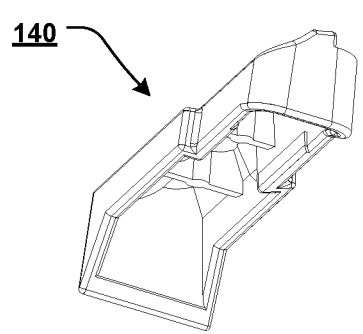
FIG. 29 illustrates a perspective view of an exemplary embodiment of a magazine follower, according to the presently disclosed systems, methods, and/or apparatuses.
Figure 30:
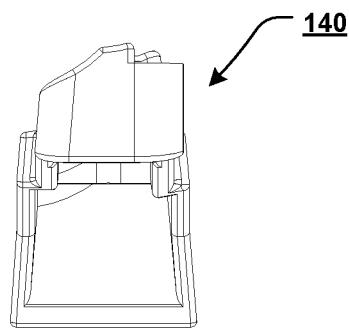
FIG. 30 illustrates a perspective view of an exemplary embodiment of a magazine follower, according to the presently disclosed systems, methods, and/or apparatuses.
Figure 31:
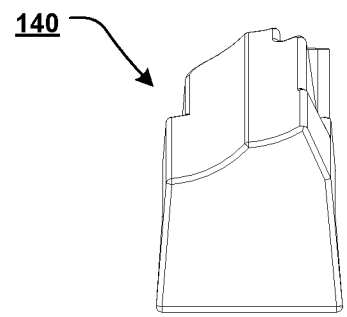
FIG. 31 illustrates a perspective view of an exemplary embodiment of a magazine follower, according to the presently disclosed systems, methods, and/or apparatuses.
Figure 32:
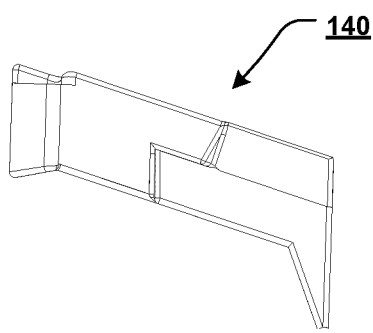
FIG. 32 illustrates a right side view of an exemplary embodiment of a magazine follower, according to the presently disclosed systems, methods, and/or apparatuses.
Figure 33:
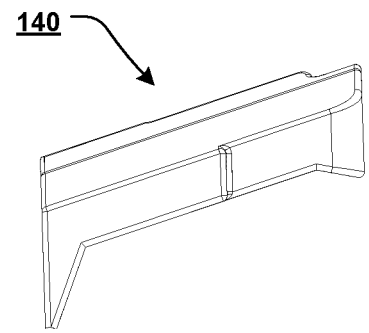
FIG. 33 illustrates a left side view of an exemplary embodiment of a magazine follower, according to the presently disclosed systems, methods, and/or apparatuses.
Figure 34:
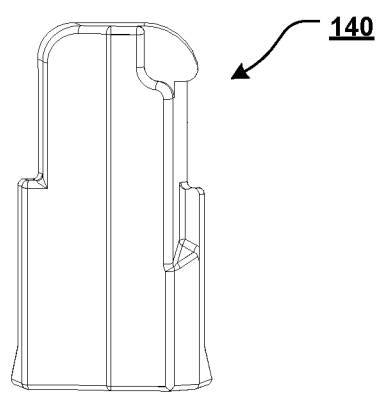
FIG. 34 illustrates a top view of an exemplary embodiment of a magazine follower, according to the presently disclosed systems, methods, and/or apparatuses.
Figure 35:
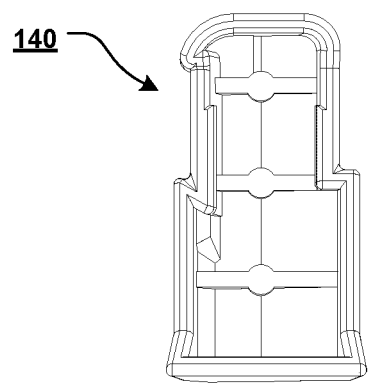
FIG. 35 illustrates a bottom view of an exemplary embodiment of a magazine follower, according to the presently disclosed systems, methods, and/or apparatuses.
Figure 36:
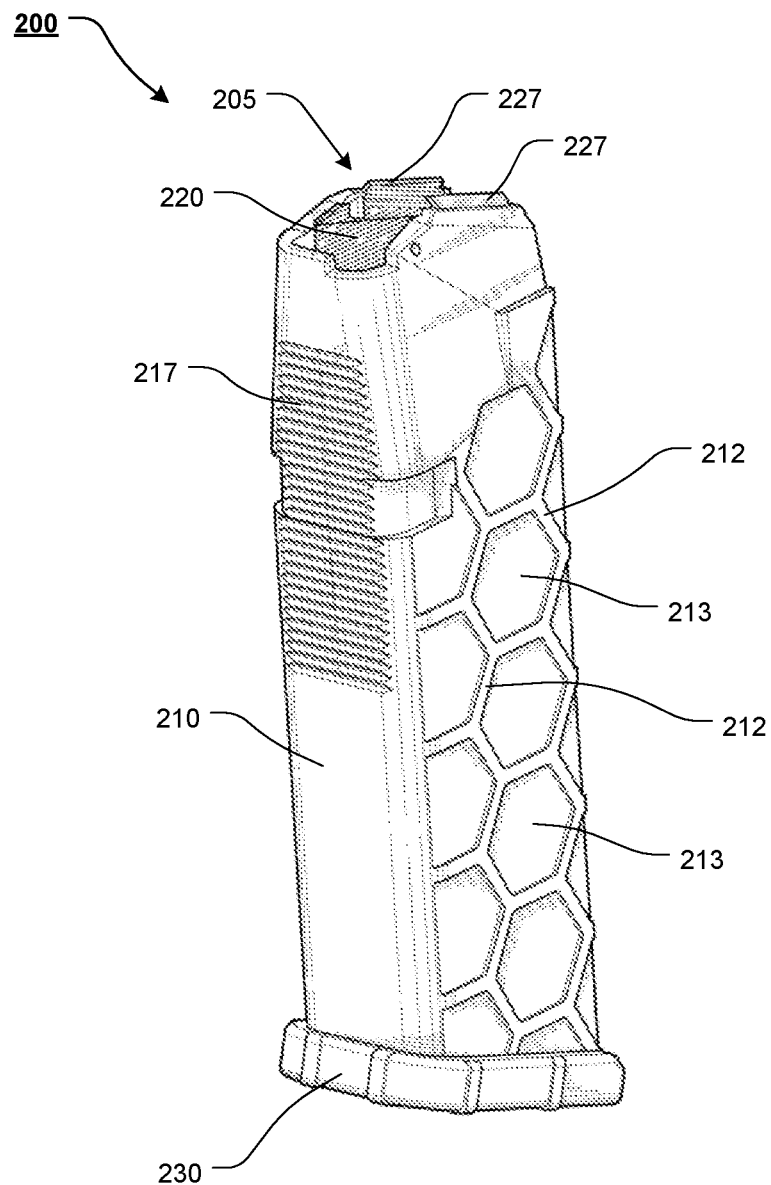
FIG. 36 illustrates a front, right perspective view of an exemplary embodiment of an overmolded firearm magazine, according to the presently disclosed systems, methods, and/or apparatuses.
Figure 37:
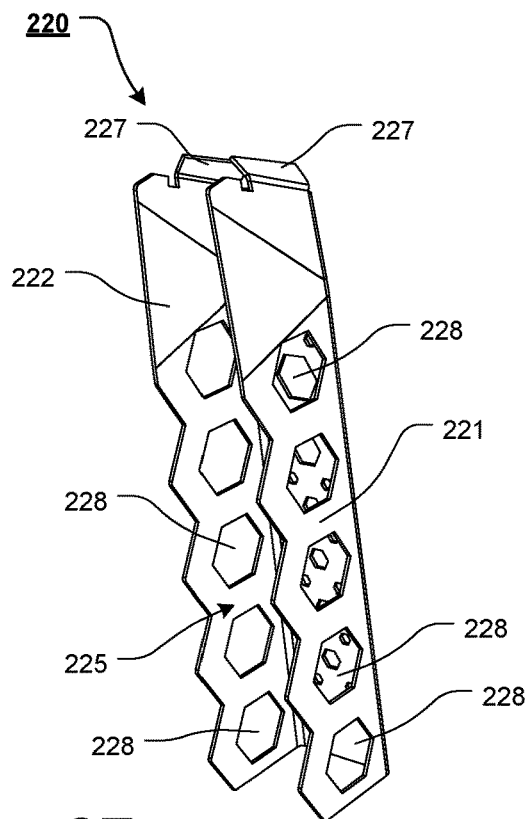
FIG. 37 illustrates a front, right perspective view of an exemplary embodiment of a magazine core, according to the presently disclosed systems, methods, and/or apparatuses.
Figure 38:
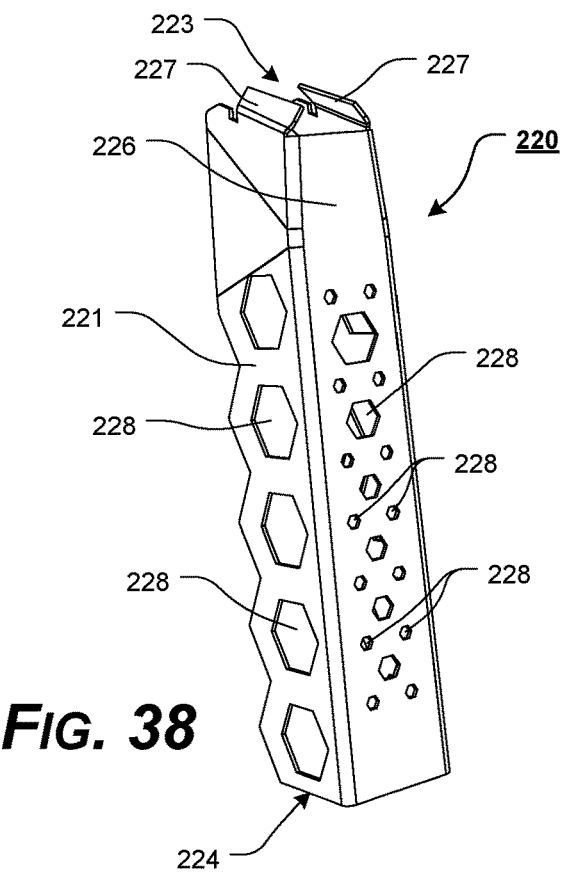
FIG. 38 illustrates a rear, right perspective view of an exemplary embodiment of a magazine core, according to the presently disclosed systems, methods, and/or apparatuses.
Figure 39:
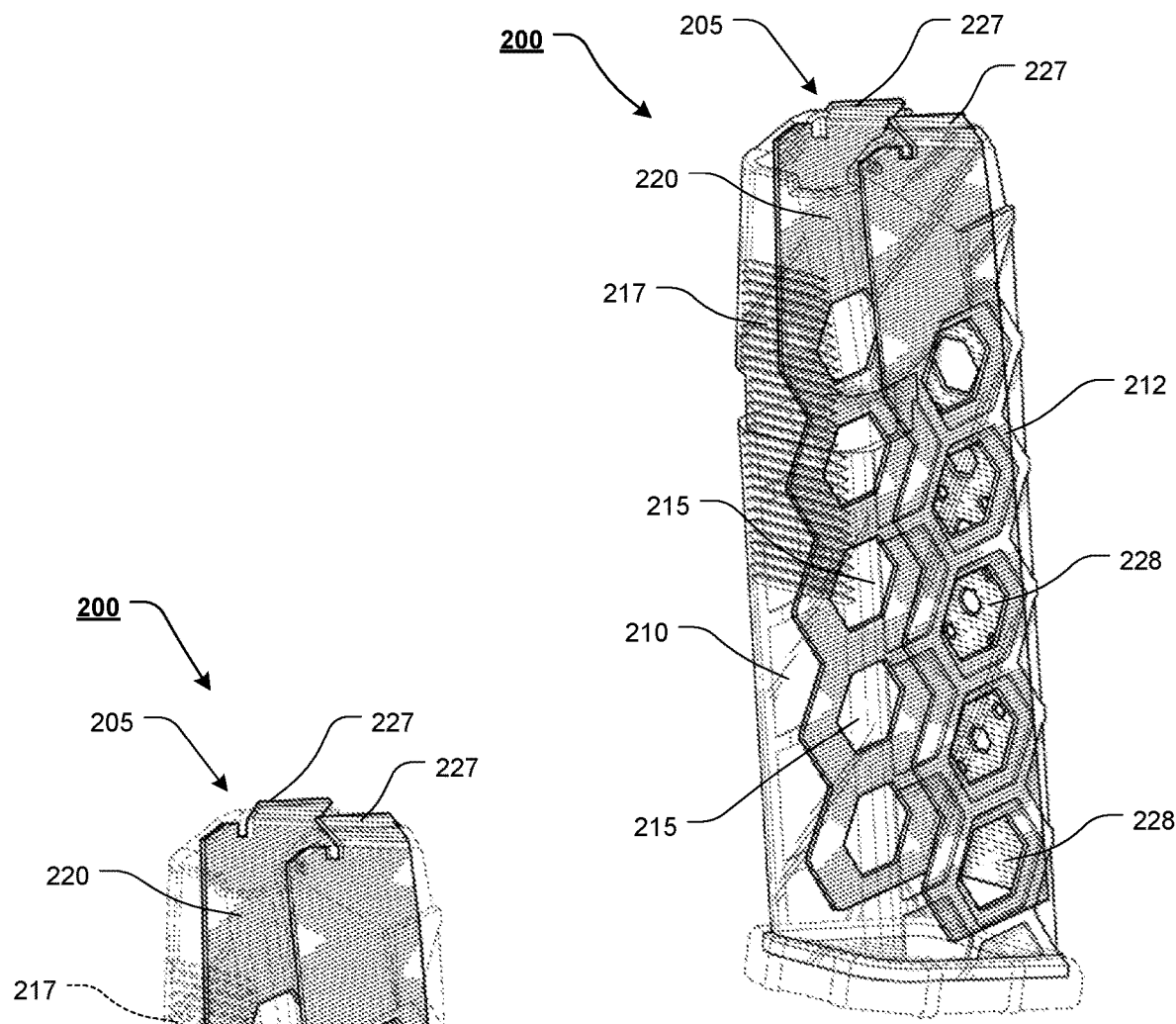
FIG. 39 illustrates a front, right perspective view of an exemplary embodiment of an overmolded firearm magazine, further illustrating the optional transparent or translucent properties of the overmolded body according to the presently disclosed systems, methods, and/or apparatuses.
Figure 40:
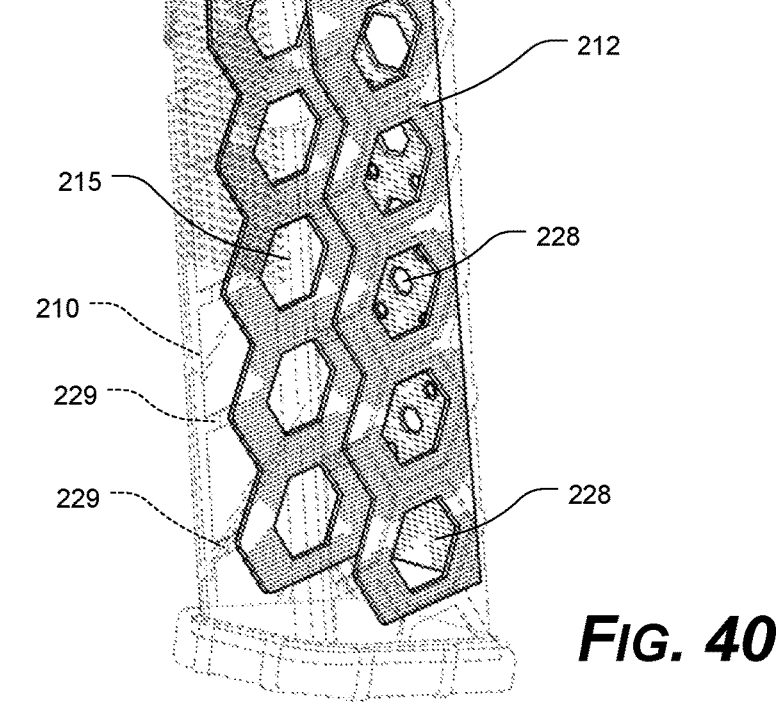
FIG. 40 illustrates a front, right perspective view of an exemplary embodiment of an overmolded firearm magazine, illustrating the overmolded body in broken lines to further clarify the magazine core according to the presently disclosed systems, methods, and/or apparatuses.
Figure 41:
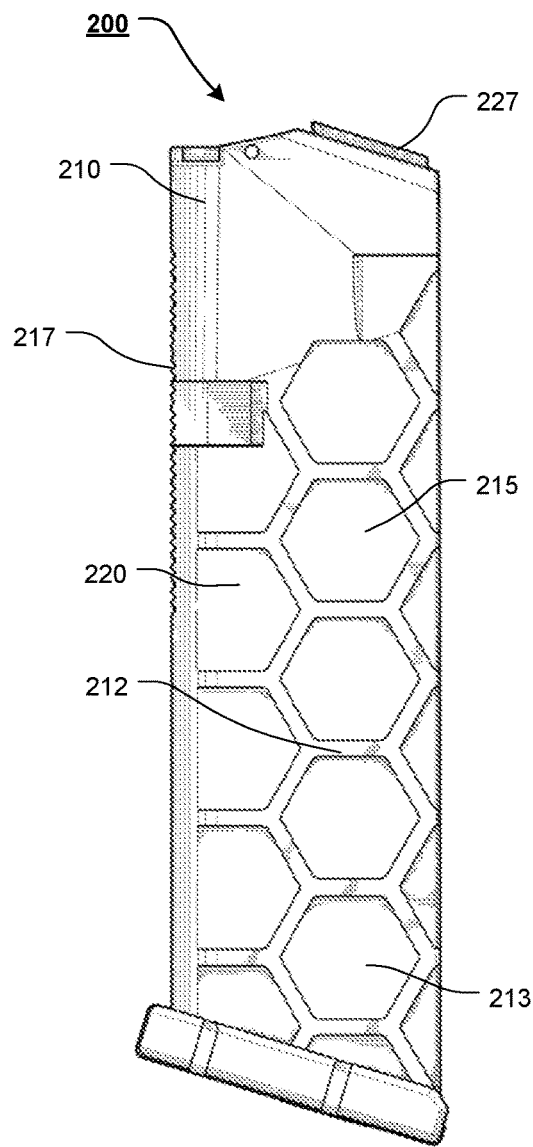
FIG. 41 illustrates a right side view of an exemplary embodiment of a magazine core, according to the presently disclosed systems, methods, and/or apparatuses.
Figure 42:
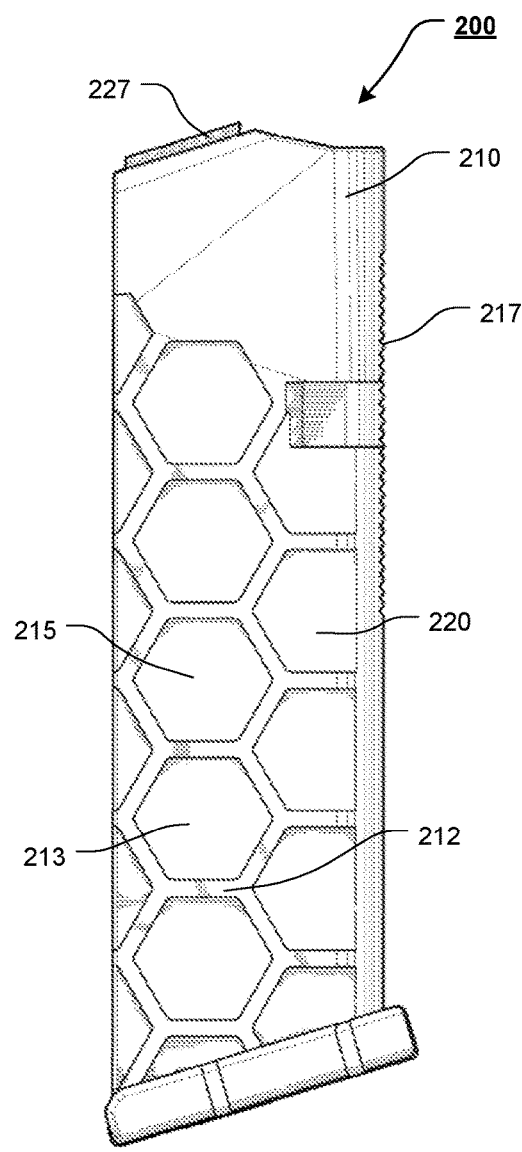
FIG. 42 illustrates a left side view of an exemplary embodiment of a magazine core, according to the presently disclosed systems, methods, and/or apparatuses.
Figure 43:
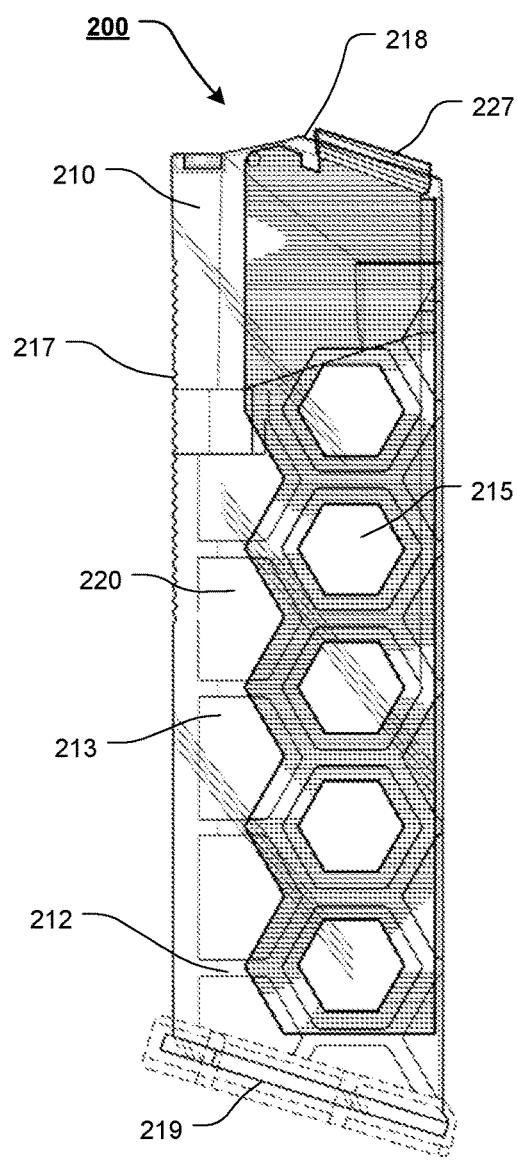
FIG. 43 illustrates a right side view of an exemplary embodiment of a magazine core, further illustrating the optional transparent or translucent properties of the overmolded body according to the presently disclosed systems, methods, and/or apparatuses.
Figure 44:
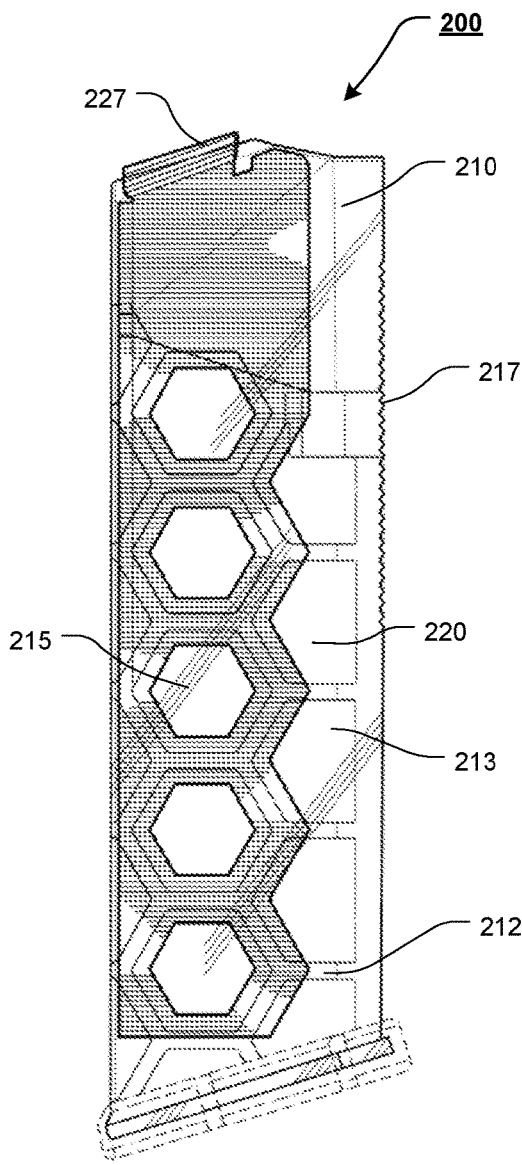
FIG. 44 illustrates a left side view of an exemplary embodiment of a magazine core, further illustrating the optional transparent or translucent properties of the overmolded body according to the presently disclosed systems, methods, and/or apparatuses.
Figure 45:
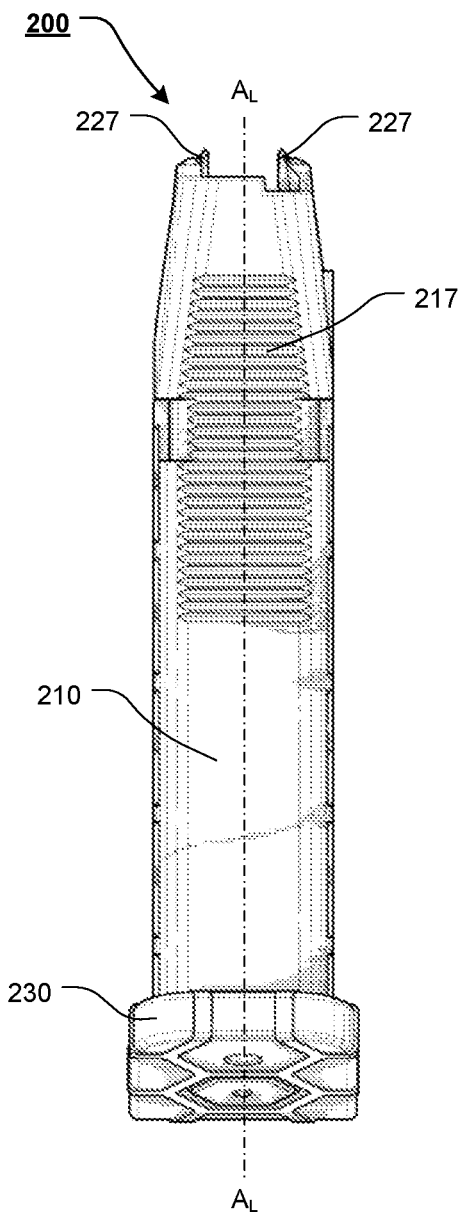
FIG. 45 illustrates a front view of an exemplary embodiment of an overmolded/through-molded magazine, according to the presently disclosed systems, methods, and/or apparatuses.
Figure 46:
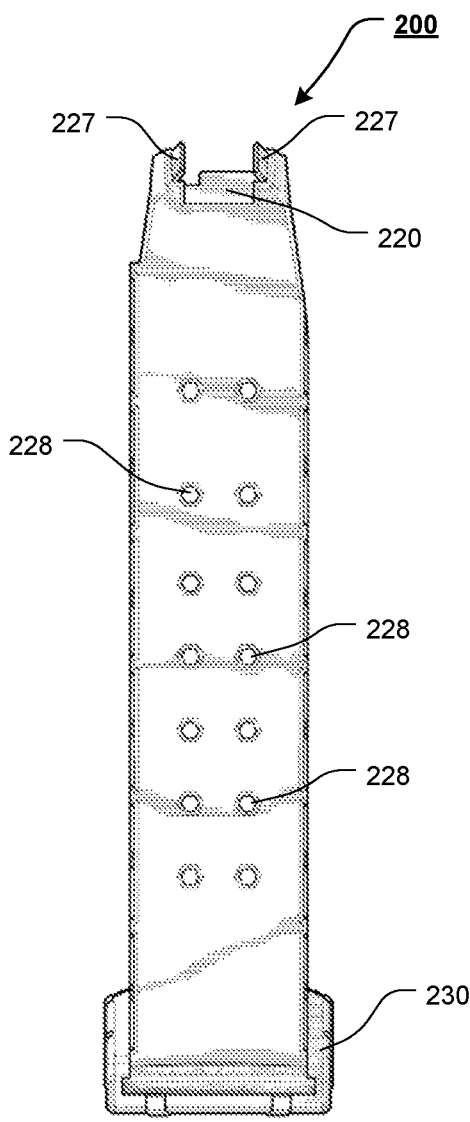
FIG. 46 illustrates a rear view of an exemplary embodiment of an overmolded/through-molded magazine, according to the presently disclosed systems, methods, and/or apparatuses.
Figure 47:
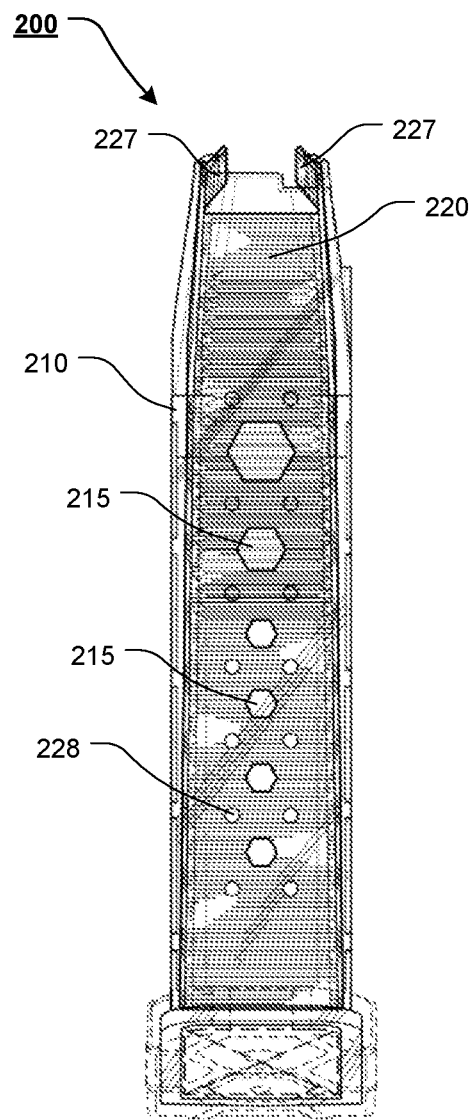
FIG. 47 illustrates a front view of an exemplary embodiment of an overmolded/through-molded magazine, further illustrating the optional transparent or translucent properties of the overmolded body according to the presently disclosed systems, methods, and/or apparatuses.
Figure 48:
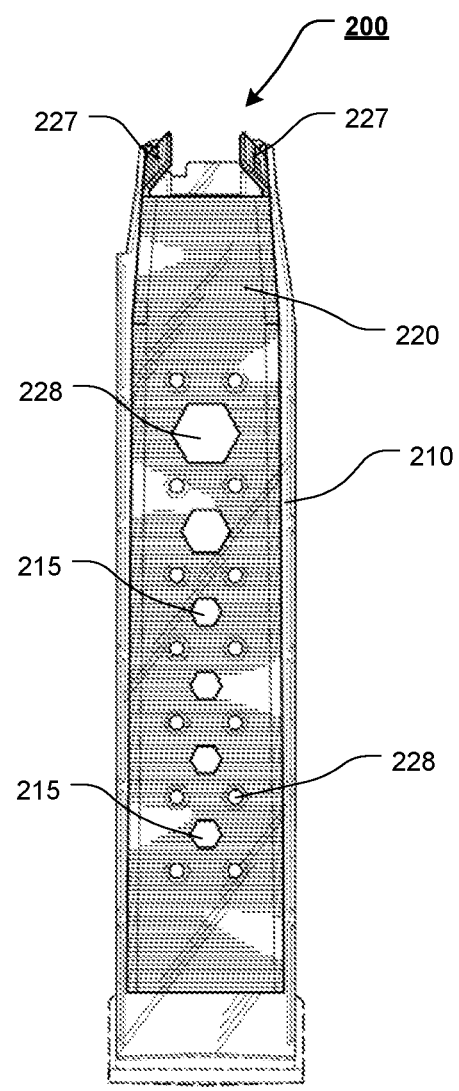
FIG. 48 illustrates a rear view of an exemplary embodiment of an overmolded/through-molded magazine, further illustrating the optional transparent or translucent properties of the overmolded body according to the presently disclosed systems, methods, and/or apparatuses.

In still other exemplary embodiments, as illustrated in FIGS. 22-23, each of the side wall ribs 129 may be formed by portions of the overmolded body 110 extending through side wall rib voids 129' or apertures formed in the magazine core 120. These side wall rib voids 129' or apertures allow at least a portion of the material used to form the overmolded body 110 to extend into or through the side wall rib voids 129' or apertures, such that at least a portion of the overmolded body 110 extends into or through at least a portion of the side wall rib voids 129' or apertures so as to extend a determined distance from each of the side walls into at least a portion of the core cavity 125 to provide stabilizing interaction to the magazine follower 140, to limit the degree of travel of the follower 140 within the magazine cavity 105, to control or limit the number of rounds that can be carried within the magazine cavity 105, and/or determine whether the overmolded/through-molded magazine 100 is to be utilized as a double-stack or single-stack magazine.

Furthermore, a single overmolded/through-molded magazine 100 could include side wall ribs 129 that extend into the core cavity 125 or the magazine cavity 105 so as to fill at least a portion of the core cavity 125 or the magazine cavity 105 and allow a variety of possible magazine followers 140 to be utilized within the magazine cavity 105 or easily retool the machinery used to form the magazine core 120 to vary the interior dimensions of the core cavity 125. In this manner, magazine capacity can be controlled or the interior dimensions of the core cavity 125 or the magazine cavity 105 can be controlled to allow a desired magazine follower 140 to be utilized, rendering the overmolded/through-molded magazine 100 easily capable of caliber conversion during the manufacturing process.

At least one core aperture/recess 128 is formed in or through a portion of one or more of the one or more of the wall portions, including, for example, the rear wall portion 126, the first side wall portion 121, and/or the second side wall portion 122. As illustrated, a plurality of core apertures/recesses 128 may be formed in or through one or more portions of one or more of the one or more wall portions.

While the core apertures/recesses 128 are illustrated as comprising a plurality of varying size hexagons, it should be understood and appreciated that the number, size, shape, and placement of the core apertures/recesses 128 is a design choice. Each core aperture/recess 128 allows at least some of the material used to form the overmolded body 110 to extend into or through the core aperture/recess 128, such that at least a portion of the overmolded body 110 extends into or through at least a portion of the at least one core aperture/recess 128. In various exemplary embodiments, the material used to form the overmolded body 110 extends through one or more of the core apertures/recesses 128 and extends into at least a portion of the magazine cavity 105.

In certain exemplary embodiments, the magazine core 120 may include a sufficient number of core aperture/recesses 128 that the magazine core 120 is substantially mesh like. Alternatively, at least one core aperture/recess 128 is formed as a recess that is not formed through the wall portion (i.e., the rear wall portion 126, the first side wall portion 121, and/or the second side wall portion 122) of the magazine core 120, but is merely formed in a portion of an exterior surface of the magazine core 120. Thus, it should be appreciated that the level of skeletonization of the magazine core 120 is a design choice based upon the desired appearance and/or functionality of the magazine core 120.

Furthermore, the one or more core aperture/recesses 128 may be formed so as to provide a desired ornamental appearance to the exterior of the magazine core 120, which may optionally be viewable through at least a portion of the overmolded body 110.

Each core aperture/recess 128 provides an anchoring or attachment point for the overmolded body 110 to be further attached or secured to the magazine core 120.

The overmolded body 110 is typically formed of a material that is less rigid than the material used to form the magazine core 120. In certain exemplary embodiments, the material used to form the overmolded body 110 is chosen so as to be able to flow easily through the core aperture/recesses 128 of the magazine core 120.

As illustrated, the overmolded body 110 is formed so as to extend atop and cover at least a portion, if not all of the magazine core 120. The overmolded body 110 may comprise a substantially transparent or translucent material, such that the magazine core 120 is viewable through the overmolded body 110. If the overmolded body 110 is substantially transparent or translucent, any open portion, such as, for example, the open front portion of the magazine core 120 and each of the core aperture/recesses 128 provides a window into the core cavity 125 and the magazine cavity 105. In this manner, a user can easily see the magazine follower 140 and any rounds contained within the magazine cavity 105.

Alternatively, the overmolded body 110 may comprise a substantially opaque material such that the magazine core 120 is not viewable or only partially viewable through one or more portions of the overmolded body 110.

The overmolded body 110 extends atop at least a portion of an exterior surface of the magazine core 120 and into or through each of the core aperture/recesses 128. The overmolded body 110 is attached or coupled directly to at least a portion of the exterior surface of the magazine core 120 as an additional layer of material over at least a portion of the exterior surface of the magazine core 120.

In various exemplary embodiments, in addition to being anchored or secured to the magazine core 120 by interaction of through-core protrusions 115 that extend into or through each of the core aperture/recesses 128, the overmolded body 110 may also be further attached by chemical or adhesive attachment, wherein a portion of the exterior surface of the overmolded body 110 is coated with an adhesive and the overmolded body 110 is affixed to the exterior surface of the magazine core 120, via the adhesive.

In certain exemplary embodiments, at least a portion of the exterior surface of the magazine core 120 may be scored or altered with surface projections or other surface preparations to provide better attachment or coupling between the exterior surface of the magazine core 120 and the overmolded body 110.

In various exemplary embodiments, one or more outer surfaces of the overmolded body 110 may include a textured portion 117 that is textured or includes tactile variations to provide an ornamental appearance to the overmolded body 110 or prove tactile recognition of various components or elements of the overmolded/through-molded magazine 100. As illustrated, the textured portion 117 comprises a plurality of substantially parallel ridges and recesses formed proximate the top end 118 of the overmolded body 110. However, it should be appreciated that this is illustrative of the textured portion 117 and not limiting. Thus, the textured portion 117 may comprise any desired degree of texturing formed in any portion of the overmolded body 110.

Through formation of the overmolded body 110, at least a portion of the overmolded body 110 extends into, partially through, or completely through each of the core apertures/recesses 128, to form a through-core protrusion 115.

In certain exemplary embodiments, each through-core protrusion 115 extends through each corresponding core aperture/recess 128 a sufficient distance to be flush or coplanar with the adjacent inner wall surface of the wall portion (i.e., the first side wall portion 121, the second side wall portion 122, or the rear wall portion 126) with which the core aperture/recess 128 is associated, depending upon where the respective core aperture/recess 128 is located.

In certain other exemplary embodiments, each through-core protrusion 115 extends through each corresponding core aperture/recess 128 and into at least a portion of the magazine cavity 105.

Figure 14:
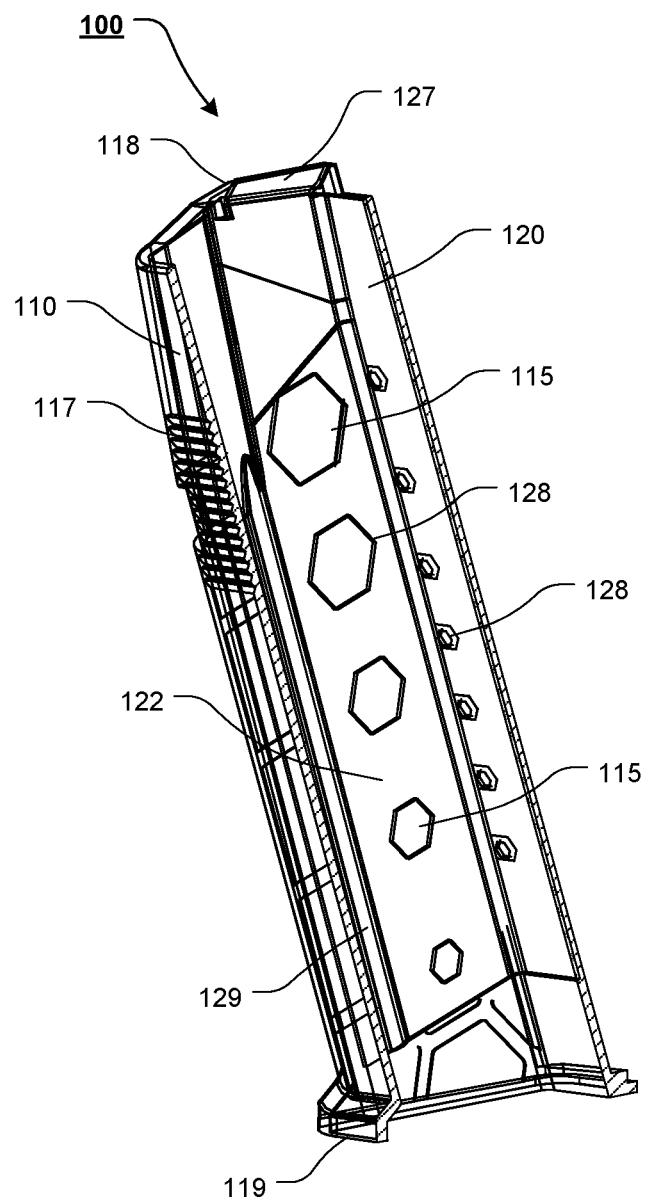
FIG. 14 illustrates a front, right perspective cutaway view of an exemplary embodiment of an overmolded/through-molded magazine, according to the presently disclosed systems, methods, and/or apparatuses.
Figure 17:
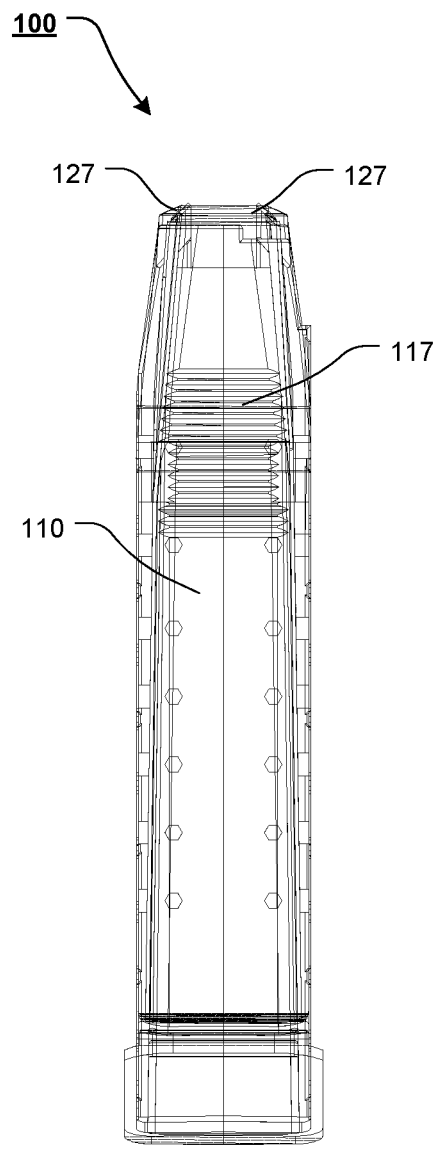
FIG. 17 illustrates a front view of an exemplary embodiment of an overmolded/through-molded magazine, according to the presently disclosed systems, methods, and/or apparatuses.
Figure 18:
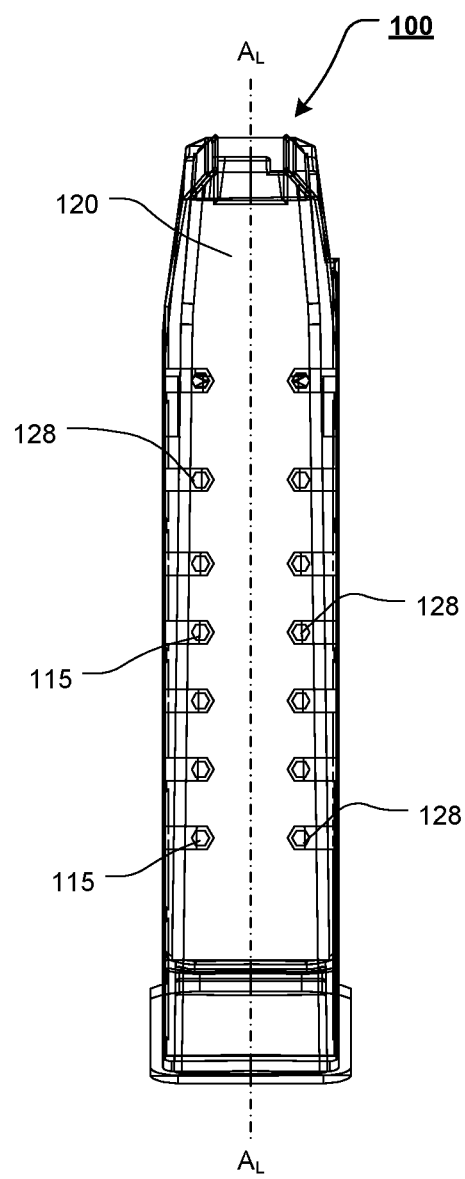
FIG. 18 illustrates a rear view of an exemplary embodiment of an overmolded/through-molded magazine, according to the presently disclosed systems, methods, and/or apparatuses.
Figure 19:
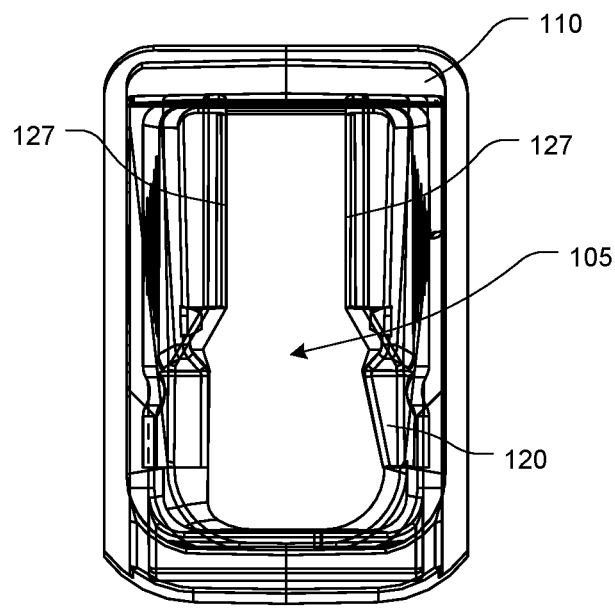
FIG. 19 illustrates a top view of an exemplary embodiment of an overmolded/through-molded magazine, according to the presently disclosed systems, methods, and/or apparatuses.
Figure 20:
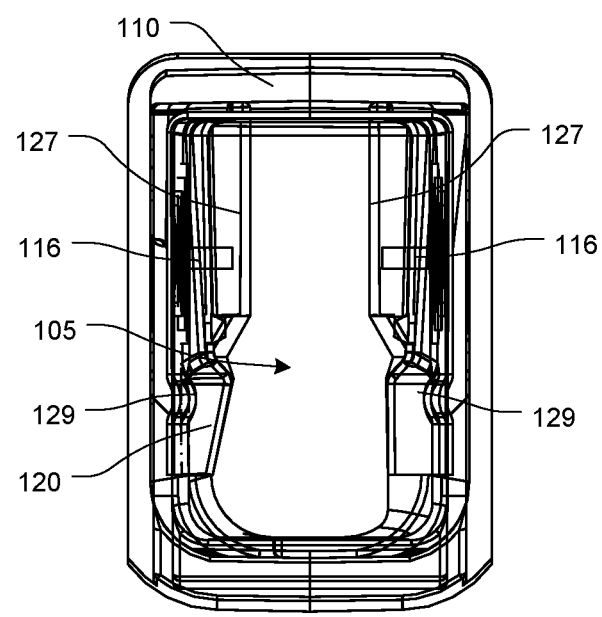
FIG. 20 illustrates a bottom view of an exemplary embodiment of an overmolded/through-molded magazine, according to the presently disclosed systems, methods, and/or apparatuses.
Figure 21:
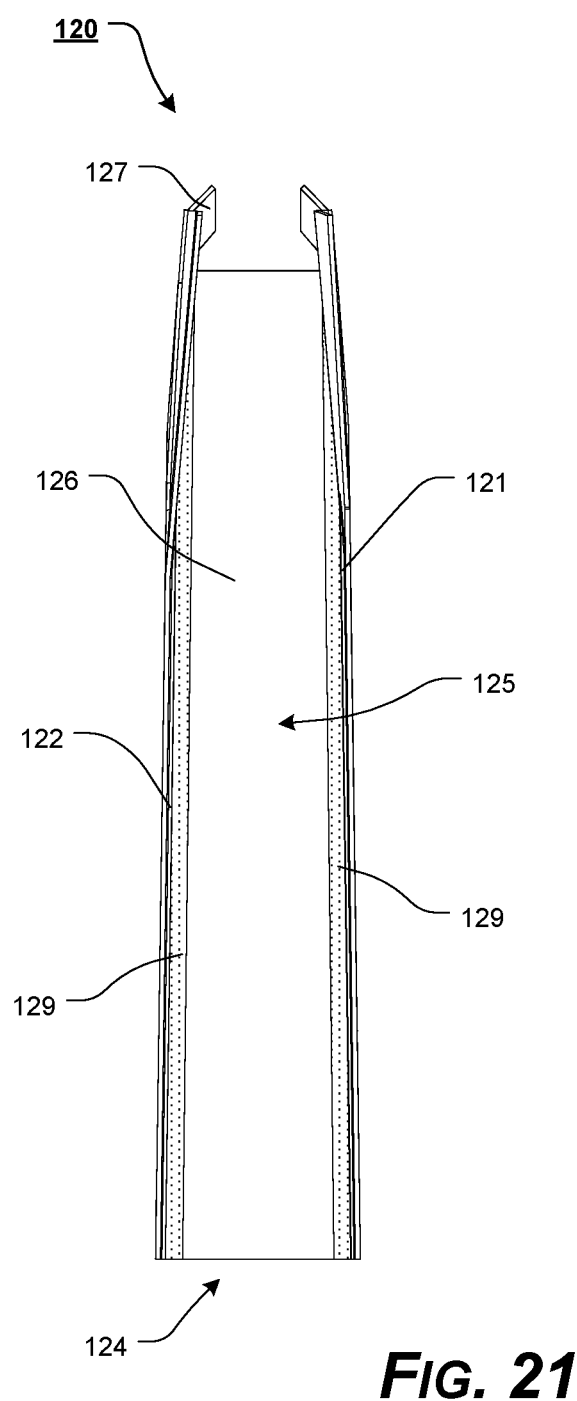
FIG. 21 illustrates a front view of an exemplary embodiment of a magazine core, according to the presently disclosed systems, methods, and/or apparatuses.

In certain exemplary embodiments, as illustrated most clearly in FIG. 14, at least a portion of the overmolded body 110 extends around at least a portion of the magazine core 120, so as to surround at least a portion of the magazine core 120 and extend into at least a portion of the magazine cavity 105. In this manner, at least a portion of the overmolded body 110 may be formed so as to extend into at least a portion of the magazine cavity 105 to provide stabilizing interaction to the magazine follower 140 or to limit the degree of travel of the follower 140 within the magazine cavity 105. For example, one or more portions of the overmolded body 110 may extend into at least a portion of the magazine cavity 105 to form interior rails or interior rail segments 116. The interior rails or interior rail segments 116 may extend so as to keep the follower 140 from traveling, for example, to the bottom end 119 of the overmolded body 110. In this manner, the number of rounds that can be carried within the magazine cavity 105 can be controlled. This allows the capacity of the magazine to optionally be controlled if, for example, a restricted capacity magazine was desired.

In certain exemplary embodiments, one or more of the through-core protrusions 115 may be formed so as to extend into at least a portion of the magazine cavity 105 to provide stabilizing interaction to the magazine follower 140 or to limit the degree of travel of the follower 140 within the magazine cavity 105. For example, one or more of the through-core protrusions 115 may extend into at least a portion of the magazine cavity 105 to form interior rails or interior rail segments 116. The interior rails or interior rail segments 116 may extend so as to keep the follower 140 from traveling, for example, to the bottom end 119 of the overmolded body 110. In this manner, the number of rounds that can be carried within the magazine cavity 105 can be controlled. This allows the capacity of the magazine to optionally be controlled if, for example, a restricted capacity magazine was desired.

Furthermore, a single overmolded/through-molded magazine 100 could include through-core protrusions 115 that extend into the magazine cavity 105 so as to fill at least a portion of the magazine cavity 105 and allow a variety of possible magazine followers 140 to be utilized within the magazine cavity 105 or easily retool the machinery used to form the overmolded/through-molded magazine 100 to vary the interior dimensions of the magazine cavity 105. In this manner, magazine capacity can be controlled or the interior dimensions of the magazine cavity 105 can be controlled to allow a desired magazine follower 140 to be utilized, rendering the overmolded/through-molded magazine 100 easily capable of caliber conversion during the manufacturing process.

The thickness, texture, density, and/or resilience of the overmolded body 110 may be varied, based upon the desired level of resilient interaction or tension provided by the through-core protrusions 115 or based upon the desired texture or other properties of the exterior of the overmolded body 110.

By varying the material used to form the overmolded body 110 (which allows for variations in thickness, texture, density, and/or resilience of the overmolded body 110), the degree to which each through-core protrusion 115 extends into the magazine cavity 105 may be determined or controlled. Additionally, by varying the material used to form the overmolded body 110, a degree of frictional tension or frictional engagement provided by the exterior of the overmolded body 110 can be determined or controlled.

In various exemplary, nonlimiting embodiments, the magazine core 120 is substantially rigid, while the overmolded body 110 is comparatively resilient.

In certain exemplary embodiments, one or more external patterns are formed in an exterior surface of the overmolded body 110. The patterns can be formed by a series of raised elements 112 and external pattern recesses 113. In various exemplary embodiments, the external pattern recesses 113 are formed so as to have a sufficient depth to allow grip tape or other textured tapes or adhesives to be applied within the external pattern recesses 113 to provide increased tactile elements to the exterior surface of the overmolded body 110. By placing the textured elements within the external pattern recesses 113, the raised elements 112 of the external pattern can provide a non-textured surface, so that the exterior of the overmolded body 110 does not provide undue friction when being inserted or removed from a firearm or a magazine carrier.

In certain exemplary, nonlimiting embodiments, during formation of the overmolded/through-molded magazine 100, the magazine core 120 is first formed or created. For example, the magazine core 120 may be formed of a bent or manipulated portion of metal or other material, may be molded, or may be formed of layers of carbon fiber.

Once the magazine core 120 is formed, it can be placed in a mold and the overmolded body 110 can be formed outside of and around at least a portion of the magazine core 120. As discussed above, the material of the overmolded body 110 is injected or otherwise molded so that various through-core projections are formed or extruded into, partially through, or completely through various core apertures/recesses 128.

In certain exemplary embodiments, because at least a portion of the overmolded body 110 is formed through the core aperture/recesses 128 and into the magazine cavity 105, a variety of magazines can be formed having a substantially similar exterior, but with differing internal dimensions for the magazine cavity 105.

For example, a single outer mold may be used to form the overmolded body 110 to the magazine core 120, while a variety of different mold inserts can be utilized to create the magazine cavity 105. As material from outside the magazine core 120 flows through the core aperture/recesses 128 and into the core cavity 125, the selected mold insert can dictate the size, shape, and/or internal dimensions of the magazine cavity 105. Thus, magazines having a substantially similar exterior can be created for various capacities or calibers.

In this manner, the amount of tooling required to produce a variety of overmolded/through-molded magazines 100 is greatly reduced, when compared to the amount of tooling required to produce known magazines.

FIGS. 36-51 illustrate certain elements, components, and/or aspects of an overmolded/through-molded magazine 200, according to the present disclosure. As illustrated, the overmolded/through-molded magazine 200 includes at least some of an overmolded body 210 extending from a top end 218 to a bottom end 219 and having one or more raised elements 212, external pattern recesses 213, one or more through-core protrusions 215, interior rail segments 216, a textured portion 217, a magazine core 220 extending from a top end 223 to a bottom end 224 and having a first side wall portion 221, a second side wall portion 222, and/or a rear wall portion 226, feed lips 227, one or more core apertures/recesses 228, one or more side wall ribs 229 (not shown), side wall rib voids 229' (not shown), a magazine cavity 205, a base plate 230, a follower 240 (not shown).

It should be understood that each of these elements corresponds to and operates similarly to the overmolded body 110 extending from the top end 118 to the bottom end 119 and having one or more raised elements 112, external pattern recesses 113, one or more through-core protrusions 115, interior rail segments 116, the textured portion 117, the magazine core 120 extending from the top end 123 to the bottom end 124 and having the first side wall portion 121, the second side wall portion 122, and/or the rear wall portion 126, feed lips 127, one or more core apertures/recesses 128, one or more side wall ribs 129, side wall rib voids 129', the magazine cavity 105, the base plate 130, the follower 140, as described above with reference to the overmolded/through-molded magazine 100 of FIGS. 1-35.

However, as illustrated in FIGS. 36-51, the shape of the magazine core 220 and the one or more core apertures/recesses 228 are different from those of the magazine core 120 and core apertures/recesses 128. Thus, the resulting through-core protrusions 215 of the overmolded body 210 vary from those of the overmolded/through-molded magazine 100.

Additionally, the one or more side wall ribs 129 of the magazine core 120 are replaced by one or more side wall ribs 229, which extend from the overmolded body 210 into at least a portion of the magazine cavity 105. In various exemplary embodiments, one or more side wall ribs 229 are formed so as to extend into at least a portion of the overmolded body 210 to help guide a follower 240 (not shown) within the magazine cavity 205 of the overmolded/ through-molded magazine 200 and/or to add rigidity to the overmolded body 210. In various exemplary embodiments, each of the side wall ribs 229 extends substantially along the longitudinal axis, $A_L$, of the overmolded body 210 from the bottom end 219 of the overmolded body 210, toward the top end 218.

Through formation of the overmolded body 210, at least a portion of the overmolded body 210 extends into, partially through, or completely through each of the core apertures/recesses 228, to form a through-core protrusion 215.

In certain exemplary embodiments, each through-core protrusion 215 extends through each corresponding core aperture/recess 228 a sufficient distance to be flush or coplanar with the adjacent inner wall surface of the wall portion (i.e., the first side wall portion 221, the second side wall portion 222, or the rear wall portion 226) with which the core aperture/recess 228 is associated, depending upon where the respective core aperture/recess 228 is located.

In certain other exemplary embodiments, each through-core protrusion 215 extends through each corresponding core aperture/recess 228 and into at least a portion of the magazine cavity 205.

Figure 49:
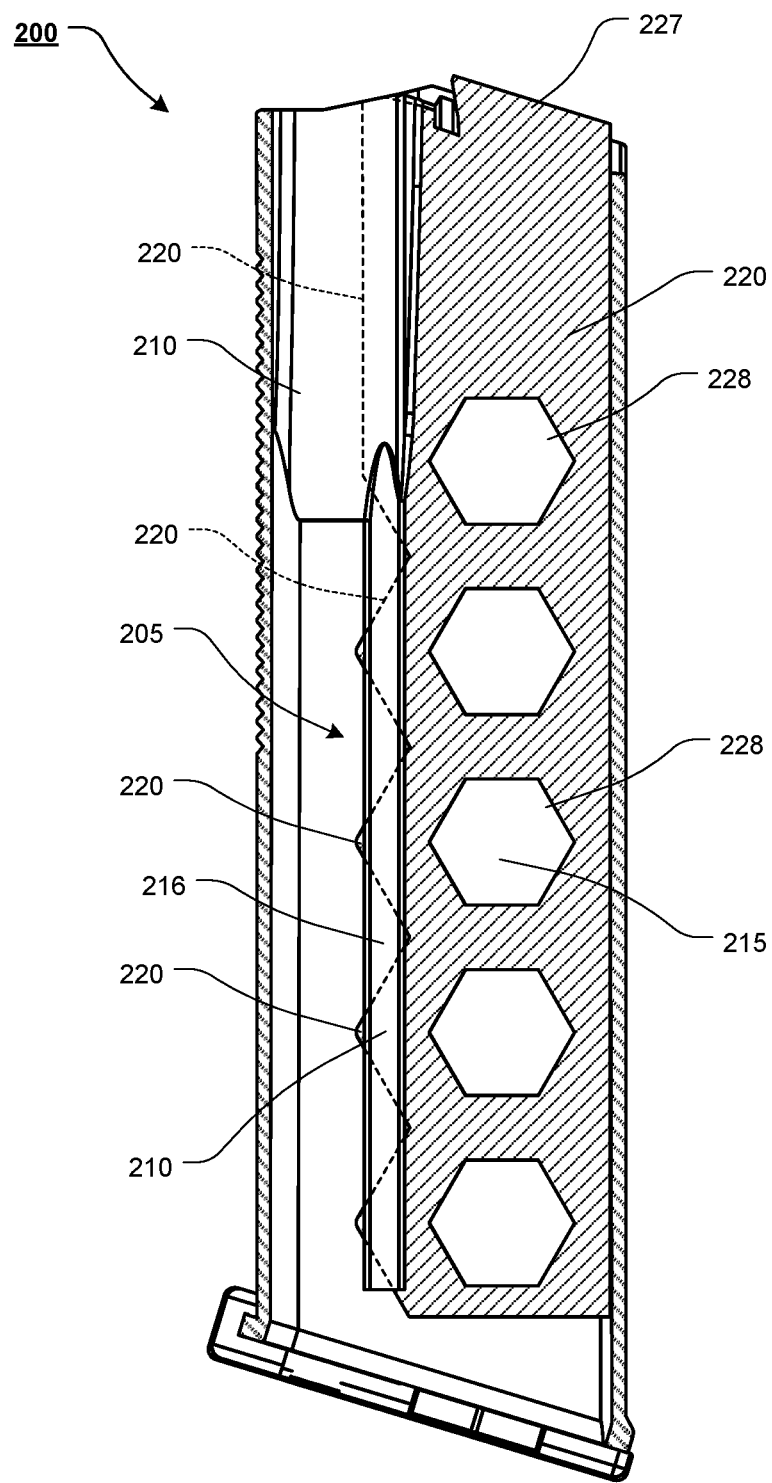
FIG. 49 illustrates a side, cross-sectional view of an exemplary embodiment of an overmolded/through-molded magazine, according to the presently disclosed systems, methods, and/or apparatuses.
Figure 50:
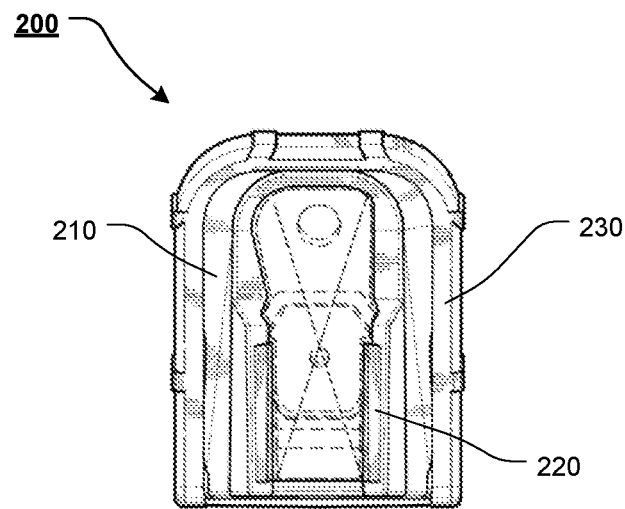
FIG. 50 illustrates a top view of an exemplary embodiment of an overmolded/through-molded magazine, according to the presently disclosed systems, methods, and/or apparatuses.
Figure 51:
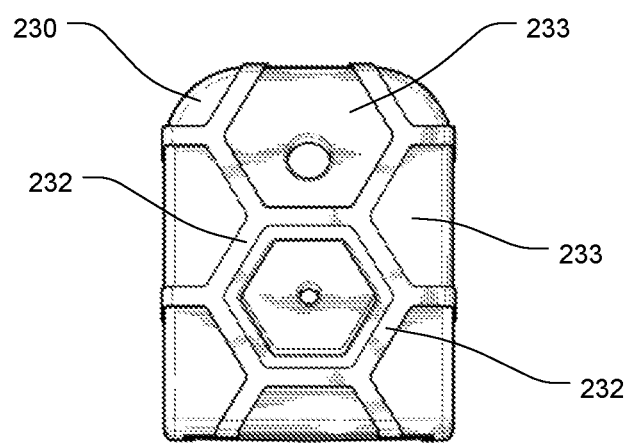
FIG. 51 illustrates a bottom view of an exemplary embodiment of an overmolded/through-molded magazine, according to the presently disclosed systems, methods, and/or apparatuses.
Figure 52:
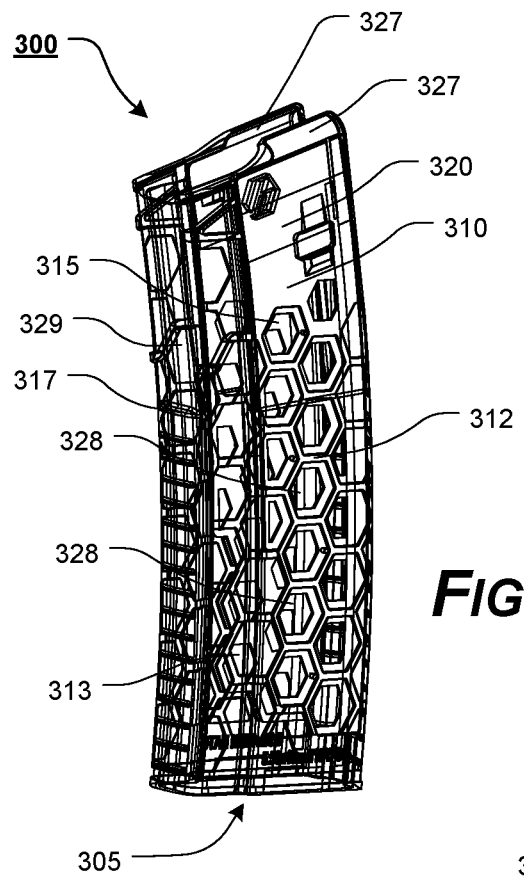
FIG. 52 illustrates a front, right perspective view of an exemplary embodiment of an overmolded firearm magazine, according to the presently disclosed systems, methods, and/or apparatuses.
Figure 53:
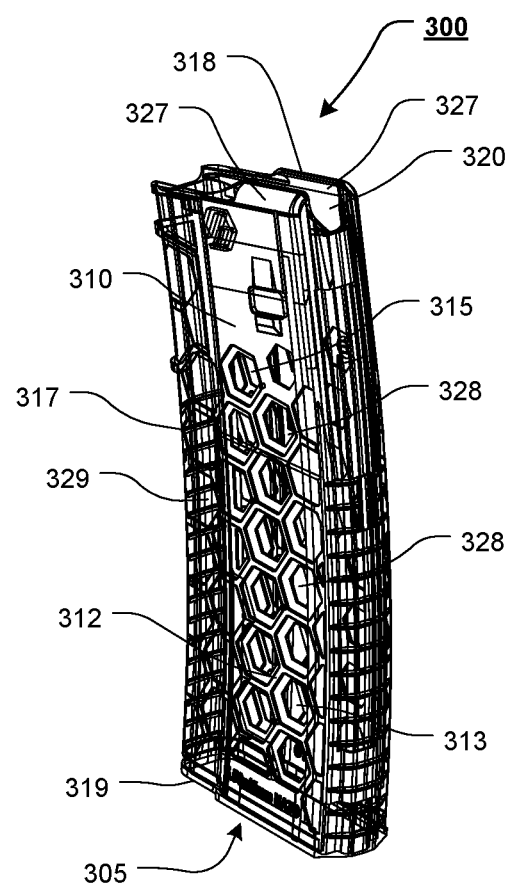
FIG. 53 illustrates a rear, right perspective view of an exemplary embodiment of an overmolded firearm magazine, according to the presently disclosed systems, methods, and/or apparatuses.
Figure 54:
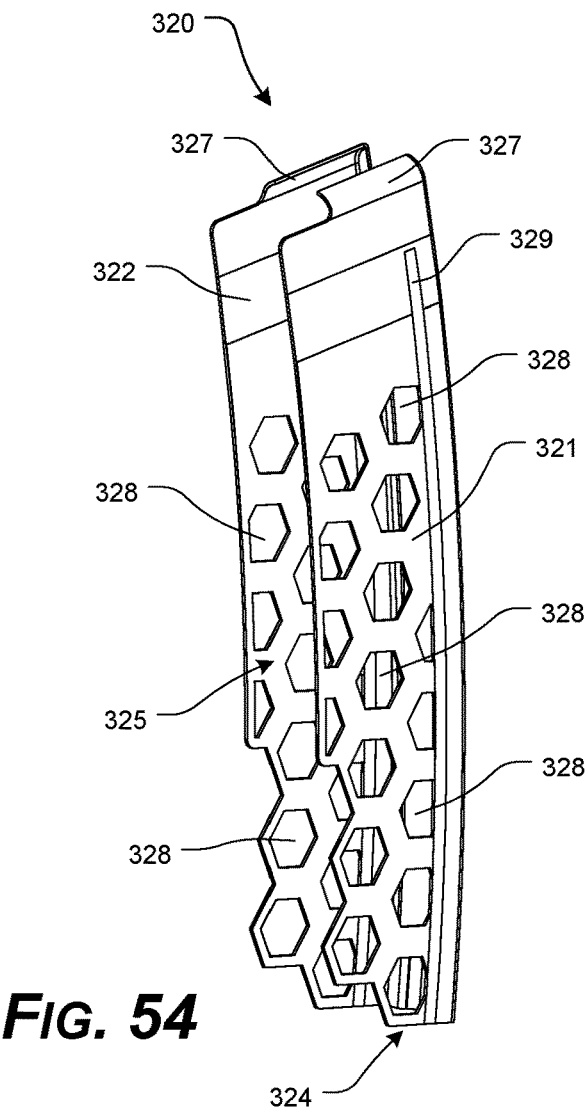
FIG. 54 illustrates a front, right perspective view of an exemplary embodiment of a magazine core, according to the presently disclosed systems, methods, and/or apparatuses.
Figure 55:
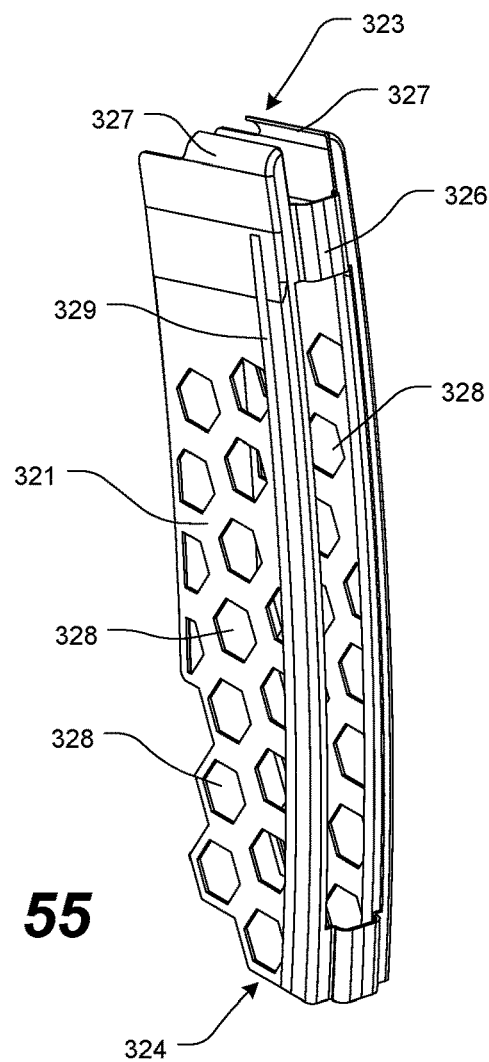
FIG. 55 illustrates a rear, right perspective view of an exemplary embodiment of a magazine core, according to the presently disclosed systems, methods, and/or apparatuses.

In certain exemplary embodiments, as illustrated most clearly in FIG. 49, at least a portion of the overmolded body 210 extends around at least a portion of the magazine core 220, so as to surround at least a portion of the magazine core 220 and extend into at least a portion of the magazine cavity 205. In this manner, at least a portion of the overmolded body 210 may be formed so as to extend into at least a portion of the magazine cavity 205 to provide stabilizing interaction to the magazine follower 240 or to limit the degree of travel of the follower 240 within the magazine cavity 205. For example, one or more portions of the overmolded body 210 may extend into at least a portion of the magazine cavity 205 to further secure portions of the magazine core 220 to portions of the overmolded body 210 and/or to form interior rails or interior rail segments 216. The interior rails or interior rail segments 216 may extend so as to keep the follower 240 from traveling, for example, to the bottom end 219 of the overmolded body 210. In this manner, the number of rounds that can be carried within the magazine cavity 205 can be controlled. This allows the capacity of the magazine to optionally be controlled if, for example, a restricted capacity magazine was desired.

In certain exemplary embodiments, each of the side wall ribs 229 may be formed so as to extend a determined distance from each of the side walls into at least a portion of the core cavity 225 to provide stabilizing interaction to the magazine follower 240 (not shown) or to limit the degree of travel of the follower 240 (not shown) within the magazine cavity 205.

Additionally, the base plate 230 also optionally includes one or more raised elements 232 defining external pattern recesses 233.

FIGS. 52-55 illustrate certain elements, components, and/or aspects of an overmolded/through-molded magazine 300, according to the present disclosure. As illustrated, the overmolded/through-molded magazine 300 includes at least some of an overmolded body 310 extending from a top end 318 to a bottom end 319 and having one or more raised elements 312, external pattern recesses 313, one or more through-core protrusions 315, interior rail segments 316, a textured portion 317, a magazine core 320 extending from a top end 323 to a bottom end 324 and having a first side wall portion 321, a second side wall portion 322, and/or a rear wall portion 326, feed lips 327, one or more core apertures/recesses 328, one or more side wall ribs 329 (not shown), side wall rib voids 329' (not shown), a magazine cavity 305, a base plate 330 (not shown), and a follower 340 (not shown).

It should be understood that each of these elements corresponds to and operates similarly to the overmolded body 110 extending from the top end 118 to the bottom end 119 and having one or more raised elements 112, external pattern recesses 113, one or more through-core protrusions 115, interior rail segments 116, the textured portion 117, the magazine core 120 extending from the top end 123 to the bottom end 124 and having the first side wall portion 121, the second side wall portion 122, and/or the rear wall portion 126, feed lips 127, one or more core apertures/recesses 128, one or more side wall ribs 129, side wall rib voids 129', the magazine cavity 105, the base plate 130, and the follower 140, as described above with reference to the overmolded/through-molded magazine 100 of FIGS. 1-35 and/or the overmolded/through-molded magazine 200 of FIGS. 36-51.

However, as illustrated in FIGS. 52-55, the overmolded/through-molded magazine 300 is generally formed so as to be received within a rifle. Therefore, as illustrated in FIGS. 52-55, the shape of the magazine core 320 and the one or more core apertures/recesses 328 are different from those of the magazine cores 120 and 220 and core apertures/recesses 128 and 228. Thus, the resulting through-core protrusions 315 of the overmolded body 310 vary from those of the overmolded/through-molded magazine 100 and the overmolded/through-molded magazine 200.

Additionally, the one or more side wall ribs 129 of the magazine core 120 are replaced by one or more side wall ribs 329, which extend from the overmolded body 310 into at least a portion of the magazine cavity 105. In various exemplary embodiments, one or more side wall ribs 329 are formed so as to extend into at least a portion of the overmolded body 310 to help guide a follower 340 (not shown) within the magazine cavity 305 of the overmolded/through-molded magazine 300 and/or to add rigidity to the overmolded body 310. In various exemplary embodiments, each of the side wall ribs 329 extends substantially along the longitudinal axis, $A_L$, of the overmolded body 310 from the bottom end 319 of the overmolded body 310, toward the top end 318.

In certain exemplary embodiments, each of the side wall ribs 329 may be formed so as to extend a determined distance from each of the side walls into at least a portion of the core cavity 325 to provide stabilizing interaction to the magazine follower 340 (not shown) or to limit the degree of travel of the follower 340 (not shown) within the magazine cavity 305.

While the presently disclosed systems, methods, and/or apparatuses has been described in conjunction with the exemplary embodiments outlined above, the foregoing description of exemplary embodiments of the presently disclosed systems, methods, and/or apparatuses, as set forth above, are intended to be illustrative, not limiting and the fundamental disclosed systems, methods, and/or apparatuses should not be considered to be necessarily so constrained. It is evident that the presently disclosed systems, methods, and/or apparatuses is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the presently disclosed systems, methods, and/or apparatuses. The upper and lower limits of these smaller ranges may independently be included in the smaller ranges and is also encompassed within the presently disclosed systems, methods, and/or apparatuses, subject to any specifically excluded limit in the stated range. Where the stated range includes one or both of the limits, ranges excluding either or both of those included limits are also included in the presently disclosed systems, methods, and/or apparatuses.

It is to be understood that the phraseology of terminology employed herein is for the purpose of description and not of limitation. Unless defined otherwise, all technical and scientific terms used herein have the same meaning as commonly understood by one of ordinary skill in the art to which the presently disclosed systems, methods, and/or apparatuses belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the presently disclosed systems, methods, and/or apparatuses, such that others may, by applying current knowledge, change, vary, modify, and/or adapt these exemplary, non-limiting embodiments for various applications without departing from the spirit and scope of the presently disclosed systems, methods, and/or apparatuses and elements or methods similar or equivalent to those described herein can be used in practicing the presently disclosed systems, methods, and/or apparatuses. Any and all such changes, variations, modifications, and/or adaptations should and are intended to be comprehended within the meaning and range of equivalents of the disclosed exemplary embodiments and may be substituted without departing from the true spirit and scope of the presently disclosed systems, methods, and/or apparatuses.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. An overmolded firearm magazine, comprising:
   one or more wall portions defining a magazine core, wherein said magazine core extends from a substantially open top portion to a substantially open bottom portion and at least partially defines a core cavity;
   at least one core aperture formed through a portion of one or more of said one or more wall portions; and
   an overmolded body formed atop at least a portion of an exterior surface of said magazine core, wherein at least a portion of said overmolded body extends into and at least partially through said at least one core aperture, forming a through-core protrusion.

2. The overmolded firearm magazine of claim 1, wherein at least a portion of said through-core protrusion of said overmolded body extends through at least a portion of said at least one core aperture such that at least a portion of said through-core protrusion is substantially coplanar with a portion of an inner wall surface of said one or more wall portions adjacent said at least one core aperture.

3. The overmolded firearm magazine of claim 1, wherein said magazine core is formed of a first side wall portion, a rear wall portion, and a second side wall portion.

4. The overmolded firearm magazine of claim 1, wherein said magazine cavity is at least partially defined by an inner wall surface of said magazine core and one or more portions of said at least one through-core protrusion.

5. The overmolded firearm magazine of claim 1, wherein said magazine core is substantially rigid.

6. The overmolded firearm magazine of claim 1, wherein said overmolded body is substantially resilient.

7. The overmolded firearm magazine of claim 1, wherein said magazine core is formed of a material that is different from a material used to form said overmolded body.

8. The overmolded firearm magazine of claim 1, wherein a material used to form said overmolded body is substantially transparent or translucent.

9. The overmolded firearm magazine of claim 1, wherein a material used to form said overmolded body is substantially opaque.

10. The overmolded firearm magazine of claim 1, wherein one or more outer surfaces of said overmolded body include a textured portion that is textured or includes tactile variations.

11. An overmolded firearm magazine, comprising:
    one or more wall portions defining a magazine core, wherein said magazine core at least partially defines a core cavity;
    at least one core aperture formed through a portion of said magazine core; and
    an overmolded body atop at least a portion of an exterior surface of said magazine core, wherein a through-core protrusion of said overmolded body extends into at least a portion of said at least one core aperture such that at least a portion of said through-core protrusion is substantially coplanar with a portion of an inner wall surface of said magazine core adjacent said at least one core aperture.

12. The overmolded firearm magazine of claim 11, wherein said magazine cavity is defined by at least a portion of said magazine core and at least a portion of said overmolded body.

13. The overmolded firearm magazine of claim 11, wherein said magazine cavity is at least partially defined by an inner wall surface of said magazine core and one or more portions of said at least one through-core protrusion.

14. The overmolded firearm magazine of claim 11, wherein said magazine core is substantially rigid.

15. The overmolded firearm magazine of claim 11, wherein said overmolded body is substantially resilient.

16. The overmolded firearm magazine of claim 11, wherein said magazine core is formed of a material that is different from a material used to form said overmolded body.

17. The overmolded firearm magazine of claim 11, wherein a material used to form said overmolded body is substantially transparent or translucent.

18. The overmolded firearm magazine of claim 11, wherein a material used to form said overmolded body is substantially opaque.

19. The overmolded firearm magazine of claim 11, wherein one or more outer surfaces of said overmolded body include a textured portion that is textured or includes tactile variations.

20. An overmolded firearm magazine, comprising:
    one or more wall portions defining a magazine core, wherein said magazine core extends from a substantially open top portion to a substantially open bottom portion and at least partially defines a core cavity, and wherein a material used to form said magazine core is substantially opaque;

at least one core aperture formed through a portion of said magazine core; and an overmolded body atop at least a portion of an exterior surface of said magazine core, wherein a through-core protrusion of said overmolded body extends into and at least partially through said at least one core aperture, and wherein a material used to form said overmolded body is substantially transparent or translucent.

\* \* \* \* \*